(12) United States Patent
Nakamizu

(10) Patent No.: US 12,378,423 B2
(45) Date of Patent: Aug. 5, 2025

(54) PAINT COMPOSITION

(71) Applicant: KANSAI PAINT CO., LTD., Hyogo (JP)

(72) Inventor: Masato Nakamizu, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 755 days.

(21) Appl. No.: 17/598,043

(22) PCT Filed: Dec. 18, 2019

(86) PCT No.: PCT/JP2019/049663
§ 371 (c)(1),
(2) Date: Sep. 24, 2021

(87) PCT Pub. No.: WO2020/194928
PCT Pub. Date: Oct. 1, 2020

(65) Prior Publication Data
US 2022/0177716 A1 Jun. 9, 2022

(30) Foreign Application Priority Data
Mar. 26, 2019 (JP) ................................ 2019-057647

(51) Int. Cl.
  C09D 7/44 (2018.01)
  C09D 7/63 (2018.01)
  C09D 7/65 (2018.01)
  C09D 133/06 (2006.01)
  C09D 133/14 (2006.01)

(52) U.S. Cl.
  CPC ............... *C09D 7/44* (2018.01); *C09D 7/63* (2018.01); *C09D 7/65* (2018.01); *C09D 133/066* (2013.01); *C09D 133/14* (2013.01)

(58) Field of Classification Search
  CPC ... C09D 7/44; C09D 7/65; C09D 7/63; C09D 133/066; C09D 133/14
  See application file for complete search history.

(56) References Cited

U.S. PATENT DOCUMENTS

| | | | |
|---|---|---|---|
| 3,870,642 A | 3/1975 | Gegner | |
| 4,851,294 A | 7/1989 | Buter et al. | |
| 6,037,404 A | 3/2000 | Dahm et al. | |
| 6,111,001 A | 8/2000 | Barancyk et al. | |
| 6,437,056 B1 | 8/2002 | Dahm et al. | |
| 2003/0125460 A1 | 7/2003 | Kato et al. | |
| 2004/0158022 A1 | 8/2004 | Baumgart et al. | |
| 2010/0258762 A1 | 10/2010 | Isobe et al. | |
| 2018/0334584 A1 | 11/2018 | Lewis et al. | |
| 2021/0277276 A1* | 9/2021 | Nakamizu | C08G 18/4063 |

FOREIGN PATENT DOCUMENTS

| | | |
|---|---|---|
| EP | 3 486 292 | 5/2019 |
| EP | 3 733 797 | 11/2020 |
| JP | 49-102708 | 9/1974 |
| JP | 61-192774 | 8/1986 |
| JP | 64-024851 | 1/1989 |
| JP | 10-251370 | 9/1998 |
| JP | 2002-506113 | 2/2002 |
| JP | 2008-527126 | 7/2008 |
| JP | 2009-529597 | 8/2009 |
| WO | 2006/074895 | 7/2006 |
| WO | 2007/104623 | 9/2007 |
| WO | 2009/072561 | 6/2009 |
| WO | 2018/012552 | 1/2018 |

OTHER PUBLICATIONS

Office Action issued Nov. 26, 2021 in corresponding Patent Application No. 201980092984.1, with English Machine Translation.
International Search Report issued Feb. 10, 2020 in International (PCT) Application No. PCT/JP2019/049663.
Extended European Search Report issued Oct. 24, 2022 in European Patent Application No. 19920950.3.

* cited by examiner

*Primary Examiner* — Jiangtian Xu
(74) *Attorney, Agent, or Firm* — Wenderoth, Lind & Ponack, L.L.P.

(57) ABSTRACT

A paint composition contains (A) a binder component, (B) a first rheology control agent, and (C) a second rheology control agent, wherein the first rheology control agent (B) is a non-aqueous dispersion resin (b); the second rheology control agent (C) contains a reaction product of (c1) a polyisocyanate compound, (c2) a primary monoamine having a number average molecular weight of 300 or less, and (c3) a polyether amine having two or more amino groups and having a number average molecular weight of 1000 or more and less than 6000; and the proportion of the polyether amine having two or more amino groups and having a number average molecular weight of 1000 or more and less than 6000 (c3) is within the range of 10 to 30 mass % based on the total amount of the components (c1) to (c3).

4 Claims, No Drawings

PAINT COMPOSITION

TECHNICAL FIELD

The present invention relates to a paint composition.

BACKGROUND ART

To impart excellent appearance and properties to a substrate, a coating film is conventionally formed on the substrate by applying a paint composition to the substrate to form a wet coating film, and curing the wet coating film.

However, when the substrate has a vertical plane, the wet coating film on the vertical plane sags, making the appearance of the resulting coating film poor. To solve this problem, research has been conducted on a paint composition containing a rheology control agent (rheology controller) with sag-control capability.

For example, PTL 1 discloses a paint composition containing a binder component and a rheology control agent; and the rheology control agent for use contains a reaction product of a polyisocyanate compound, a primary monoamine having a number average molecular weight of 300 or less, and a polyether amine having a number average molecular weight of more than 300 and less than 6000.

CITATION LIST

Patent Literature

PTL 1: WO2018/012552A

SUMMARY OF INVENTION

Technical Problem

The coating film formed from the paint composition disclosed in PTL 1 is excellent in transparency, water resistance, and finished appearance. However, there is room for further improvement in sag resistance, and finished appearance and water blushing resistance of the resulting coating film.

The present invention was made in view of the current situation described above. An object of the present invention is to provide a paint composition excellent in sag resistance during coating, and finished appearance and water blushing resistance of the resulting coating film.

Solution to Problem

The present inventors conducted extensive research to achieve the above object, and found that the object can be achieved by a paint composition containing (A) a binder component, (B) a first rheology control agent, and (C) a second rheology control agent, wherein the first rheology control agent (B) is a non-aqueous dispersion resin (b), the second rheology control agent (C) contains a reaction product of (c1) a polyisocyanate compound, (c2) a primary monoamine having a number average molecular weight of 300 or less, and (c3) a polyether amine having two or more amino groups and having a number average molecular weight of 1000 or more and less than 6000, the proportion of the polyether amine having two or more amino groups and having a number average molecular weight of 1000 or more and less than 6000 (c3) is within the range of 10 to 30 mass % based on the total amount of the components (c1) to (c3).

Specifically, the present invention includes the following subject matter.

In an embodiment, provided is a paint composition comprising
(A) a binder component,
(B) a first rheology control agent, and
(C) a second rheology control agent,
wherein
the first rheology control agent (B) is a non-aqueous dispersion resin (b),
the second rheology control agent (C) contains a reaction product of (c1) a polyisocyanate compound, (c2) a primary monoamine having a number average molecular weight of 300 or less, and (c3) a polyether amine having two or more amino groups and having a number average molecular weight of 1000 or more and less than 6000, and
the proportion of the polyether amine having two or more amino groups and having a number average molecular weight of 1000 or more and less than 6000 (c3) is within a range of 10 to 30 mass % based on the total amount of the components (c1) to (c3).

In another embodiment, the polyether amine having two or more amino groups and having a number average molecular weight of 1000 or more and less than 6000 (c3) has three or more amino groups.

In another embodiment, the proportion of the polyether amine having two or more amino groups and having a number average molecular weight of 1000 or more and less than 6000 (c3) is within the range of 15 to 30 mass % based on the total amount of the components (c1) to (c3).

In another embodiment, the binder component (A) contains a hydroxy-containing resin (A1) and a crosslinking agent (A2).

Advantageous Effects of Invention

The paint composition of the present invention forms a coating film excellent in sag resistance during coating, and finished appearance and water blushing resistance of the resulting coating film.

DESCRIPTION OF EMBODIMENTS

The paint composition of the present invention is described below in more detail.

Binder component (A)

The binder component (A) itself has film-forming properties. The binder component (A) may be either non-crosslinkable or crosslinkable; in particular, the binder component (A) is preferably crosslinkable. As the binder component (A), a known film-forming resin that has been used as a binder component for paint can be used.

Examples of film-forming resins include acrylic resins, polyester resins, alkyd resins, polyurethane resins, and the like. The film-forming resin preferably contains a crosslinkable functional group, such as hydroxy, carboxy, or epoxy.

In addition to the film-forming resin, a crosslinking agent can also be used as the binder component (A). When a crosslinking agent is used as a part of the binder component (A), a resin (a base resin) that contains a crosslinkable functional group, such as hydroxy, carboxy, or epoxy, and that can form a crosslinked coating film by reaction with the crosslinking agent, can be generally used as the film-forming resin. From the viewpoint of, for example, the water resistance of the resulting coating film, the paint composition of the present invention is preferably a crosslinkable paint containing the base resin and the crosslinking agent.

In particular, the paint composition of the present invention preferably contains a hydroxy-containing resin (A1) as at least part of the base resin, and a crosslinking agent (A2) reactive with the hydroxy-containing resin as at least part of the crosslinking agent.

Hydroxy-Containing Resin (A1)

The hydroxy-containing resin (A1) is a resin having at least one hydroxy group per molecule. Various known resins can be used as the hydroxy-containing resin (A1). Examples include hydroxy-containing acrylic resins, hydroxy-containing polyester resins, hydroxy-containing acrylic-modified polyester resins, hydroxy-containing polyether resins, hydroxy-containing polycarbonate resins, hydroxy-containing polyurethane resins, hydroxy-containing epoxy resins, hydroxy-containing alkyd resins, and like resins. These may be used singly, or in a combination of two or more. In particular, from the viewpoint of, for example, the water resistance of the resulting coating film, the hydroxy-containing resin (A1) is preferably a hydroxy-containing acrylic resin (A1-1).

Hydroxy-Containing Acrylic Resin (A1-1)

The hydroxy-containing acrylic resin (A1-1) can be obtained, for example, by copolymerizing a hydroxy-containing polymerizable unsaturated monomer and another polymerizable unsaturated monomer (a polymerizable unsaturated monomer other than the hydroxy-containing polymerizable unsaturated monomer).

The hydroxy-containing polymerizable unsaturated monomer is a compound containing one or more hydroxy groups and one or more polymerizable unsaturated bonds per molecule. Examples of hydroxy-containing polymerizable unsaturated monomers include monoesterified products of (meth)acrylic acid with a dihydric alcohol having 2 to 8 carbon atoms (e.g., 2-hydroxyethyl(meth) acrylate, 2-hydroxypropyl(meth) acrylate, 3-hydroxypropyl(meth)acrylate, and 4-hydroxybutyl (meth)acrylate); ε-caprolactone-modified products of such monoesterified products of (meth) acrylic acid with a dihydric alcohol having 2 to 8 carbon atoms; adducts of (meth)acrylic acid with an epoxy-containing compound (e.g., Cardura E10P, trade name, produced by Momentive Specialty Chemicals Inc., neodecanoic acid glycidyl ester); N-hydroxymethyl (meth)acrylamide; allyl alcohol; (meth)acrylates that include a hydroxy-terminated polyoxyethylene chain; and the like.

As another polymerizable unsaturated monomer copolymerizable with the hydroxy-containing polymerizable unsaturated monomer, for example, the monomers listed in (1) to (6) below can be used. These polymerizable unsaturated monomers may be used singly, or in a combination of two or more.

(1) Acid Group-Containing Polymerizable Unsaturated Monomers

An acid group-containing polymerizable unsaturated monomer is a compound having one or more acid groups and one or more polymerizable unsaturated bonds per molecule. Examples of the monomer include carboxy-containing monomers, such as (meth)acrylic acid, crotonic acid, itaconic acid, maleic acid, and maleic anhydride; sulfonic acid-containing monomers, such as vinyl sulfonic acid and 2-sulfoethyl(meth)acrylate; and acidic phosphate monomers, such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid. These monomers may be used singly, or in a combination of two or more. When an acid group-containing polymerizable unsaturated monomer is used, the monomer is preferably used in such an amount that the hydroxy-containing acrylic resin (A1-1) has an acid value of preferably 0.5 to 15 mg KOH/g, and more preferably 1 to 10 mg KOH/g.

(2) Esterified Products of Acrylic Acid or Methacrylic Acid with a Monohydric Alcohol Having 1 to 20 Carbon Atoms Specific examples include methyl(meth)acrylate, ethyl (meth)acrylate, propyl(meth)acrylate, n-butyl(meth)acrylate, iso-butyl(meth)acrylate, tert-butyl(meth)acrylate, 2-ethylhexyl(meth)acrylate, isooctyl(meth)acrylate, isomyristyl(meth)acrylate, stearyl(meth)acrylate, Isostearyl Acrylate (trade name, produced by Osaka Organic Chemical Industry, Ltd.), lauryl(meth)acrylate, tridecyl(meth)acrylate, tetrahydrofurfuryl(meth)acrylate, cyclohexyl(meth)acrylate, isobornyl(meth)acrylate, and the like.

(3) Aromatic Vinyl Monomers

Specific examples include styrene, α-methylstyrene, vinyltoluene, and the like.

When an aromatic vinyl monomer is used as a constituent component, the glass transition temperature of the resulting resin is raised, and a hydrophobic coating film with a high refractive index can be obtained. This provides an effect of improving the finished appearance due to increased gloss of the coating film.

When an aromatic vinyl monomer is used as a constituent component, its proportion is preferably within the range of 3 to 50 mass %, and more preferably 5 to 40 mass %, based on the total amount of the monomer components.

(4) Glycidyl Group-Containing Polymerizable Unsaturated Monomers

A glycidyl group-containing polymerizable unsaturated monomer is a compound having one or more glycidyl groups and one or more polymerizable unsaturated bonds per molecule. Specific examples include glycidyl acrylate, glycidyl methacrylate, and the like.

(5) Compounds Containing Nitrogen and a Polymerizable Unsaturated Bond

Examples include (meth)acrylamide, N,N-dimethyl (meth)acrylamide, N-[3-(dimethylamino)propyl](meth) acrylamide, N-butoxymethyl(meth)acrylamide, diacetone (meth)acrylamide, N,N-dimethylaminoethyl(meth)acrylate, vinylpyridine, vinylimidazole, acrylonitrile, methacrylonitrile, and the like.

(6) Other Vinyl Compounds

Examples include vinyl acetate, vinyl propionate, vinyl chloride, vinyl versatates, and the like. Examples of vinyl versatates include the commercially available products VEOVA 9 and VEOVA 10 (trade names, produced by Japan Epoxy Resin Co., Ltd.), and the like.

As other polymerizable unsaturated monomers, those listed in (1) to (6) above may be used singly, or in a combination of two or more.

The term "polymerizable unsaturated monomer" as used herein refers to a monomer having one or more (e.g., one to four) polymerizable unsaturated groups. The polymerizable unsaturated group refers to an unsaturated group that can undergo radical polymerization. Examples of polymerizable unsaturated groups include a vinyl group, a (meth)acryloyl group, a (meth)acrylamide group, a vinyl ether group, an allyl group, a propenyl group, an isopropenyl group, a maleimide group, and the like.

The term "(meth)acrylate" as used herein means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

From the viewpoint of the curability and water resistance, the hydroxy-containing acrylic resin (A1-1) preferably has a hydroxy value of 70 to 200 mg KOH/g, more preferably 80 to 185 mg KOH/g, and even more preferably 100 to 170 mg KOH/g.

From the viewpoint of the finished appearance and curability of the coating film, the hydroxy-containing acrylic resin (A1-1) preferably has a weight average molecular weight of 2000 to 50000, more preferably 3000 to 30000, and even more preferably 4000 to 10000.

In the present specification, the average molecular weight refers to a value calculated from a chromatogram measured by gel permeation chromatography based on the molecular weight of standard polystyrene. For the gel permeation chromatography, HLC8120GPC (produced by Tosoh Corporation) was used. The measurement was conducted using four columns: TSKgel G-4000HXL, TSKgel G-3000HXL, TSKgel G-2500HXL, and TSKgel G-2000HXL (trade names, all produced by Tosoh Corporation) under the following conditions: mobile phase: tetrahydrofuran; measuring temperature: 40° C.; flow rate: 1 cc/min; detector: RI.

The glass transition temperature of the hydroxy-containing acrylic resin (A1-1) is within the range of preferably −50 to 60° C., more preferably 10 to 50° C., and particularly preferably 20 to 45° C., from the viewpoint of the hardness and finished appearance of the coating film.

In the present specification, the glass transition temperature (° C.) of the acrylic resin was calculated using the following formulae.

$$1/Tg(K) = (W1/T1) + (W2/T2) + \quad (1)$$

$$Tg(° C.) = Tg(K) - 273 \quad (2)$$

In each formula, W1, W2, . . . represent the mass fractions of the monomers used for copolymerization, and T1, T2, . . . represent the Tg (K) of homopolymers of each of the monomers. T1, T2, . . . are the values disclosed in the Polymer Handbook (Second Edition, J. Brandrup and E.H. Immergut ed.), III-139 to 179. When the Tg of the homopolymer of a monomer is unclear, the glass transition temperature (° C.) refers to a static glass transition temperature. For example, a sample is taken in a measuring cup and subjected to vacuum suction to completely remove the solvent, followed by measurement of changes in the quantity of heat at a heating rate of 3° C./min in a temperature range of −20° C. to 200° C. using a DSC-220U differential scanning calorimeter (produced by Seiko Instruments Inc.). The initial change point in the baseline at the low-temperature side is considered to be the static glass transition temperature.

The hydroxy-containing acrylic resin (A1-1) has an acid value of preferably 0.5 to 15 mg KOH/g, and more preferably 1 to 10 mg KOH/g, from the viewpoint of, for example, the pot life of the paint composition and the finished appearance.

The method for copolymerizing the monomer mixture to obtain the hydroxy-containing acrylic resin (A1-1) is not particularly limited, and known copolymerization methods can be used. Among those, a solution polymerization method, in which polymerization is conducted in an organic solvent in the presence of a polymerization initiator, is preferably used.

Examples of organic solvents used in the solution polymerization method include toluene, xylene, Swasol 1000 (trade name, produced by Cosmo Oil Co., Ltd., an oil-based high-boiling-point solvent), and like aromatic solvents; ethyl acetate, butyl acetate, propyl propionate, butyl propionate, 1-methoxy-2-propyl acetate, 2-ethoxyethyl propionate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; isopropanol, n-butanol, iso-butanol, 2-ethylhexanol, and like alcohol-based solvents; and the like.

These organic solvents may be used singly, or in a combination of two or more. From the viewpoint of the solubility of the acrylic resin, ester-based solvents and ketone-based solvents are preferable. Further, an aromatic solvent may be suitably used in combination.

Examples of polymerization initiators used for copolymerizing the hydroxy-containing acrylic resin (A1-1) include known radical polymerization initiators, such as 2,2'-azobisisobutyronitrile, benzoyl peroxide, di-t-butyl peroxide, di-t-amyl peroxide, t-butyl peroctoate, 2,2'-azobis(2-methylbutyronitrile), and 2,2'-azobis(2,4-dimethylvaleronitrile).

The hydroxy-containing acrylic resins (A1-1) may be used singly, or in a combination of two or more.

Secondary-Hydroxy-Containing Acrylic Resin (A1-1a)

From the viewpoint of the finished appearance of the resulting coating film, a secondary-hydroxy-containing acrylic resin (A1-1a) can also be suitably used as one of the embodiments of the hydroxy-containing acrylic resin (A1-1).

The secondary-hydroxy-containing acrylic resin (A1-1a) can be produced, for example, by using a secondary-hydroxy-containing polymerizable unsaturated monomer as one type of the hydroxy-containing polymerizable unsaturated monomer described above in the method for producing the hydroxy-containing acrylic resin (A1-1).

Examples of the secondary-hydroxy-containing polymerizable unsaturated monomer include polymerizable unsaturated monomers having a secondary-hydroxy group whose alkyl group in the ester moiety has 2 to 8, preferably 3 to 6, and more preferably 3 or 4 carbon atoms, such as 2-hydroxypropyl(meth) acrylate, 2-hydroxybutyl(meth) acrylate, and 3-hydroxybutyl(meth)acrylate; adducts of (meth)acrylic acid with an epoxy-containing compound (e.g., Cardura E10P, trade name, produced by Momentive Specialty Chemicals Inc., neodecanoic acid glycidyl ester); and the like. These may be used singly, or in a combination of two or more. From the viewpoint of the finished appearance of the resulting coating film, 2-hydroxypropyl (meth)acrylate is preferably used.

When the secondary-hydroxy-containing polymerizable unsaturated monomer described above is used in producing the secondary-hydroxy-containing acrylic resin (A1-1a), the amount of the secondary-hydroxy-containing polymerizable unsaturated monomer is within the range of preferably 15 to 45 mass %, and more preferably 20 to 40 mass %, based on the total amount of the copolymerizable monomer components that constitute the secondary-hydroxy-containing acrylic resin (A1-1a), from the viewpoint of the finished appearance of the resulting coating film.

In the secondary-hydroxy-containing acrylic resin (A1-1a), the content of the secondary-hydroxy-containing polymerizable unsaturated monomer in the total amount of the hydroxy-containing polymerizable unsaturated monomer is within the range of preferably 50 to 100 mass %, more preferably 55 to 100 mass %, and still more preferably 60 to 100 mass %, from the viewpoint of the water resistance and finished appearance of the resulting coating film.

Hydroxy- and Alkoxysilyl-Containing Acrylic Resin (A1-1b)

As another embodiment of the hydroxy-containing acrylic resin (A1-1), a hydroxy- and alkoxysilyl-containing acrylic resin (A1-1b) can be preferably used from the viewpoint of scratch resistance of the resulting coating film.

The hydroxy- and alkoxysilyl-containing acrylic resin (A1-1b) is a resin having at least one hydroxy group and at least one alkoxysilyl group per molecule.

The use of the hydroxy- and alkoxysilyl-containing acrylic resin (A1-1b) forms a crosslinkage due to a condensation reaction between alkoxysilyl groups and a reaction between an alkoxysilyl group and a hydroxyl group, thus increasing the curability of the coating film.

Examples of the alkoxy moiety of the alkoxysilyl group present in the hydroxy- and alkoxysilyl-containing acrylic resin (A1-1b) include an alkoxy moiety having about 1 to 6 carbon atoms, preferably about 1 to 3 carbon atoms, such as methoxy, ethoxy, and propoxy. The alkoxy moiety is more preferably methoxy and ethoxy, and particularly preferably methoxy from the viewpoint of scratch resistance of the resulting coating film.

The alkoxysilyl group includes a trialkoxysilyl group, a dialkoxysilyl group, and a monoalkoxysilyl group. The alkoxysilyl group is preferably a trialkoxysilyl group from the viewpoint of scratch resistance of the resulting coating film.

When the alkoxysilyl group is a dialkoxysilyl group or a monoalkoxysilyl group, the groups other than the alkoxy that binds to the silicon atom include alkyl having about 1 to 6 carbon atoms, preferably about 1 to 3 carbon atoms (e.g., methyl, ethyl, and propyl).

The hydroxy- and alkoxysilyl-containing acrylic resin (A1-1b) can be obtained, for example, by using an alkoxysilyl-containing polymerizable unsaturated monomer as one type of the polymerizable unsaturated monomer and other polymerizable unsaturated monomers in the method for producing the hydroxy-containing acrylic resin (A1-1).

The alkoxysilyl-containing polymerizable unsaturated monomer is a compound having at least one alkoxysilyl group and at least one polymerizable unsaturated bond per molecule. Examples of alkoxysilyl-containing polymerizable unsaturated monomers include vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane, and vinyltris(β-methoxyethoxy)silane.

The alkoxysilyl-containing polymerizable unsaturated monomer is preferably vinyltrimethoxysilane, γ-acryloxypropyltrimethoxysilane, and γ-methacryloxypropyltrimethoxysilane, and more preferably γ-methacryloxypropyltrimethoxysilane from the viewpoint of scratch resistance of the resulting coating film.

The alkoxysilyl-containing polymerizable unsaturated monomer for use may be a commercially available product. Examples include KBM-1003, KBE-1003, KBM-502, KBM-503, KBE-502, KBE-503, KBM-5103, and KBM-5803 (all produced by Shin-Etsu Chemical Co., Ltd.); Y-9936 and A-174 (produced by Momentive Performance Materials Inc.); and OFS-6030 and Z-6033 (produced by Dow Toray Co., Ltd.).

These alkoxysilyl-containing polymerizable unsaturated monomers can be used singly, or in combination of two or more.

Specifically, the hydroxy- and alkoxysilyl-containing acrylic resin (A1-1b) can be obtained, for example, by copolymerizing the hydroxy-containing polymerizable unsaturated monomer, the alkoxysilyl-containing polymerizable unsaturated monomer, and other polymerizable unsaturated monomers (polymerizable unsaturated monomers other than the hydroxy-containing polymerizable unsaturated monomer and alkoxysilyl-containing polymerizable unsaturated monomer). The other polymerizable unsaturated monomers that can be used in copolymerization are, for example, other polymerizable unsaturated monomers (1) to (6) for use in obtaining the hydroxy-containing acrylic resin (A1-1). The polymerizable unsaturated monomers can be used singly, or in combination of two or more.

In producing the hydroxy- and alkoxysilyl-containing acrylic resin (A1-1b), the amount of the hydroxy-containing polymerizable unsaturated monomer for use is preferably within the range of 5 to 60 mass %, more preferably 15 to 50 mass %, and still more preferably 25 to 45 mass %, based on the total amount of the copolymerizable monomer components that constitute the hydroxy- and alkoxysilyl-containing acrylic resin (A1-1b) from the viewpoint of scratch resistance, water resistance, curability, and finished appearance of the resulting coating film.

The hydroxy value of the hydroxy- and alkoxysilyl-containing acrylic resin (A1-1b) is preferably within the range of 70 to 200 mg KOH/g, more preferably 80 to 190 mg KOH/g, and still more preferably 100 to 180 mg KOH/g from the viewpoint of scratch resistance, water resistance, curability, and finished appearance of the resulting coating film.

Secondary-Hydroxy- and Alkoxysilyl-Containing Acrylic Resin (A1-1c)

As another embodiment of the hydroxy-containing acrylic resin (A1-1), a secondary-hydroxy- and alkoxysilyl-containing acrylic resin (A1-1c) can be used from the viewpoint of finished appearance of the resulting coating film.

The secondary-hydroxy- and alkoxysilyl-containing acrylic resin (A1-1c) is included in the secondary-hydroxy-containing acrylic resin (A1-1a), and also in the hydroxy- and alkoxysilyl-containing acrylic resin (A1-1b).

The secondary-hydroxy- and alkoxysilyl-containing acrylic resin (A1-1c) can be produced, for example, by using a secondary-hydroxy-containing polymerizable unsaturated monomer (e.g., a secondary-hydroxy-containing polymerizable unsaturated monomer usable in the production of the secondary-hydroxy-containing acrylic resin (A1-1a)) as one type of the hydroxy-containing polymerizable unsaturated monomer in the method for producing the hydroxy- and alkoxysilyl-containing acrylic resin (A1-1b).

When the secondary-hydroxy-containing polymerizable unsaturated monomer described above is used in the production of the secondary-hydroxy- and alkoxysilyl-containing acrylic resin (A1-1c), the amount of the secondary-hydroxy-containing polymerizable unsaturated monomer for use is preferably within the range of 15 to 45 mass %, and more preferably 20 to 40 mass % based on the total amount of the copolymerizable monomer components that constitute the secondary-hydroxy- and alkoxysilyl-containing acrylic resin (A1-1c) from the viewpoint of finished appearance of the resulting coating film.

In the production of the secondary-hydroxy- and alkoxysilyl-containing acrylic resin (A1-1c), the content of the secondary-hydroxy-containing polymerizable unsaturated monomer in the total amount of the hydroxy-containing polymerizable unsaturated monomer is preferably within the range of 50 to 100 mass %, more preferably 55 to 100 mass %, and still more preferably 60 to 100 mass % from the viewpoint of water resistance and finished appearance of the resulting coating film.

Examples of film-forming resins usable as the binder component (A) other than those described above in the paint composition of the present invention include hydroxy-free acrylic resin, hydroxy-containing or hydroxy-free polyester resin, hydroxy-containing or hydroxy-free polyether resin, and hydroxy-containing or hydroxy-free polyurethane resin. Of these, hydroxy-containing polyester resin and hydroxy-containing polyurethane resin are preferable as a film-forming resin.

The hydroxy-containing polyester resin can be produced by a commonly used method, such as esterification between a polybasic acid and a polyhydric alcohol. The polybasic acid is a compound having two or more carboxyl groups per molecule, such as phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof. The polyhydric alcohol is a compound having two or more hydroxyl groups per molecule, and examples include diols, such as ethylene glycol, propylene glycol, 1,3-propanediol, 1,4-butanediol, 1,5-pentanediol, 1,6-hexanediol, 2,2-diethyl-1,3-propanediol, neopentylglycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethylpentanediol, and hydrogenated bisphenol A; trihydric or higher polyol components, such as trimethvlolpropane, trimethylolethane, glycerin, and pentaerythritol; and hydroxycarboxylic acids, such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid.

An α-olefin epoxide, such as propylene oxide and butylene oxide, or a rnonoepoxy compound, such as Cardura E10P (trade name, produced by Momentive Specialty Chemicals, a glycidyl ester of a synthetic highly-branched saturated fatty acid), may be reacted with an acid to introduce these compounds into a polyester resin.

The introduction of carboxyl groups into a polyester resin can be performed, for example, by adding an acid anhydride to a hydroxy-containing polyester, and half-esterifying the hydroxy-containing polyester.

The hydroxy value of the hydroxy-containing polyester resin is preferably within the range of 80 to 250 mg KOH/g, and more preferably 100 to 200 mg KOH/g. The weight average molecular weight of the hydroxy-containing polyester resin is preferably within the range of 500 to 3500, and more preferably 500 to 2500.

The hydroxy-containing polyurethane resin is, for example, a hydroxy-containing polyurethane resin obtained by reacting a polyol with a polyisocyanate.

Examples of low-molecular weight polyols include dihydric alcohols, such as ethylene glycol, diethylene glycol, propylene glycol, butylene glycol, and hexamethylene glycol; and trihydric alcohols, such as trimethylol propane, glycerin, and pentaerythritol. Examples of high-molecular weight polyols include polyether polyols, polyester polyols, acrylic polyols, and epoxy polyols. Examples of polyether polyols include polyethylene glycol, polypropylene glycol, and polytetramethylene glycol. Examples of polyester polyols include the dihydric alcohols described above, polycondensation products of an alcohol, such as dipropylene glycol, 1,4-butanediol, 1,6-hexanediol, or neopentyl glycol with a dibasic acid, such as adipic acid, azelaic acid, or sebacic acid; lactone-based ring-opening polymer polyols, such as polycaprolactone; and polycarbonate diol. For example, carboxy-containing polyols such as 2,2-dimethylolpropionic acid, and 2,2-dimethylolbutanoic acid are also usable.

Examples of the polyisocyanate for reacting with a polyol include aliphatic polyisocyanates, such as hexamethylene diisocyanate, trimethyl hexamethylene diisocyanate, dimeric acid diisocyanate, and lysine diisocyanate; biuret-type adducts of these polyisocyanates, and isocyanurate-ring adducts of these polyisocyanates; alicyclic diisocyanates, such as isophorone diisocyanate, 4,4'-methylene bis(cyclohexylisocyanate), methyl cyclohexane-2,4-(or -2,6-)diisocyanate, 1,3-(or 1,4-) di(isocyanatomethyl) cyclohexane, 1,4-cyclohexane diisocyanate, 1,3-cyclopentane diisocyanate, and 1,2-cyclohexane diisocyanate; biuret-type adducts of these polyisocyanates, and isocyanurate-ring adducts of these polyisocyanates; aromatic diisocyanate compounds, such as xylylene diisocyanate, meta-xylylene diisocyanate, tetramethyl xylylene diisocyanate, tolylene diisocyanate, 4,4'-diphenyl methane diisocyanate, 1,5-naphthalene diisocyanate, 1,4-naphthalene diisocyanate, 4,4-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl) sulfone, and isopropylidene bis(4-phenylisocyanate); biuret-type adducts of these polyisocyanates, and isocyanurate-ring adducts of these polyisocyanates; polyisocyanates having three or more isocyanate groups per molecule, such as triphenyl methane-4, 4',4"-triisocyanate, 1,3,5-triisocyanatobenzene, 2,4,6-triisocyanato toluene, and 4,4'-dimethyldiphenylmethane-2,2',5, 5'-tetraisocyanate; and biuret-type adducts of these polyisocyanates, and isocyanurate-ring adducts of these polyisocyanates.

The hydroxy value of the hydroxy-containing polyurethane resin is preferably within the range of 80 to 250 mg KOH/g, and more preferably 100 to 200 mg KOH/g. The weight average molecular weight of the hydroxy-containing polyurethane resin is preferably within the range of 500 to 10000, and more preferably 1000 to 5000.

When the hydroxy-containing acrylic resin (A1-1) and a resin other than the hydroxy-containing acrylic resin (A1-1) (more specifically, polyester resin, polyurethane resin, polyether resin, or the like.) are used in combination as the binder component (A), the content of the resin other than the hydroxy-containing acrylic resin (A1-1) is preferably within the range of 50 parts by mass or less, and more preferably 1 to 20 parts by mass, per 100 parts by mass of the solids content of the hydroxy-containing acrylic resin (A1-1).

Crosslinking Agent (A2)

In the paint composition of the present invention, the binder component (A) can contain a crosslinking agent (A2). The crosslinking agent (A2) is a compound that can react with a crosslinkable functional group in the binder component (A), and that can form a cross-linking structure by the reaction. It is preferable that the crosslinkable functional group in the binder component (A) is a hydroxy group, and that the crosslinking agent (A2) is a compound having reactivity with a hydroxy group.

Specifically, for example, the crosslinking agent (A2) is preferably a polyisocyanate compound, a blocked polyisocyanate compound, or an amino resin. In particular, from the viewpoint of the finished appearance, scratch resistance, and the like, the crosslinking agent (A2) preferably contains a polyisocyanate compound.

The polyisocyanate compound is a compound having at least two isocyanate groups per molecule. Examples include aliphatic polyisocyanate compounds, alicyclic polyisocyanate compounds, aromatic-aliphatic polyisocyanate compounds, aromatic polyisocyanate compounds, derivatives of these polyisocyanate compounds, and the like.

Examples of aliphatic polyisocyanate compounds include aliphatic diisocyanate compounds, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); aliphatic triisocyanate compounds, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanate compounds include alicyclic diisocyanate compounds, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl) diisocyanate (common name: hydrogenated MDI), and norbornane diisocyanate; alicyclic triisocyanate compounds, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanate compounds include aromatic-aliphatic diisocyanate compounds, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanate compounds, such as 1,3,5-triisocyanatomethylbenzene; and the like.

Examples of aromatic polyisocyanate compounds include aromatic diisocyanate compounds, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI) or 2,6-tolylene diisocyanate (common name: 2,6-TDI) or mixtures thereof, 4,4'-toluidine diisocyanate, and 4,4'-diphenylether diisocyanate; aromatic triisocyanate compounds, such as triphenylmethane-4,4',4''-triisocyanate, 1,3,5-triisocyanatobenzene, and 2,4,6-triisocyanatotoluene; aromatic tetraisocyanate compounds, such as 4,4'-diphenylmethane-2,2',5,5'- tetraisocvanate; and the like.

Examples of derivatives of the polyisocyanate compounds include dimers, trimers, biurets, allophanates, uretdiones, uretimine, isocyanurates, oxadiazinetriones, polymethylene polyphenyl polyisocyanates (crude MDI, polymeric MDI), crude TDI, and the like, of the polyisocyanate compounds mentioned above.

The polyisocyanate compounds and derivatives thereof mentioned above may be used singly, or in a combination of two or more.

From the viewpoint of the weatherability or the like of the resulting coating film, the polyisocyanate compound for use is preferably at least one member selected from the group consisting of an aliphatic polyisocyanate compound, an alicyclic polyisocyanate compound, and a derivative thereof. From the viewpoint of an increase in the solids content of the obtained paint composition, and the finished appearance and scratch resistance of the resulting coating film, the polyisocyanate compound for use is more preferably an aliphatic polyisocyanate compound and/or a derivative thereof.

The aliphatic polyisocyanate compound and/or a derivative thereof for use is preferably an aliphatic diisocyanate compound and/or an isocyanurate thereof, and more preferably hexamethylene diisocyanate and/or an isocyanurate thereof, from the viewpoint of an increase in the solids content of the obtained paint composition, and the finished appearance and scratch resistance of the resulting coating film.

When the paint composition of the present invention contains a polyisocyanate compound described above as the crosslinking agent (A2), the proportion of the polyisocyanate compound is preferably within the range of 5 to 60 parts by mass, more preferably 15 to 50 parts by mass, and still more preferably 25 to 45 parts by mass, per 100 parts by mass of the total solids content of the hydroxy-containing resin (A1) and the crosslinking agent (A2), from the viewpoint of the finished appearance and scratch resistance of the resulting coating film.

The blocked polyisocyanate compound usable as the crosslinking agent (A2) is a compound obtained by blocking isocyanate groups of a polyisocyanate compound described above with a blocking agent.

Examples of blocking agents include phenol compounds, such as phenol, cresol, xylenol, nitrophenol, ethyiphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohol compounds, such as methanol, ethanol, propyl alcohol, butyl alcohol, amyl alcohol, and lauryl alcohol; ether compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime compounds, such as formamide oxime, acetamide oxime, acetoxime, methyl ethyl ketoxime, diacetyl monoxime, benzophenone oxime, and cyclohexane oxime; active methylene compounds, such as dimethyl malonate, diethyl malonate, ethyl acetoacetate, methyl acetoacetate, and acetylacetone; mercaptan compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide compounds, such as acetanilide, acetanisidide, acetotoluide, acrylamide, methacrylamide, acetic acid amide, stearic acid amide, and benzamide; imide compounds, such as succinimide, phthalimide, and maleimide; amine compounds, such as diphenylamine, phenylnaphthylamine, xylidine, N-phenylxylidirie, carbazole, aniline, naphthylamine, butylamine, dibutylamine, and butylphenvlamine; imidazole compounds, such as imidazole and 2-ethylimidazole; urea compounds, such as urea, thiourea, ethylene urea, ethylenethiourea, and diphenylurea; carbamate compounds, such as phenyl N-phenylcarbamate; imine compounds, such as ethyleneimine and propyleneimine; sulfite compounds, such as sodium bisulfite and potassium bisulfite; azole compounds; and the like. Examples of the azole compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; imidazoline derivatives, such as 2-methylimidazoline and 2-phenylimidazoline; and the like.

Particularly preferable blocking agents are, for example, oxime-based blocking agents, active methylene-based blocking agents, and pyrazole or pyrazole derivatives.

When blocking is performed (when a blocking agent is reacted), a solvent may be added, if necessary. The solvent used in the blocking reaction is preferably a solvent that is not reactive with an isocyanate group. Examples of such solvents include ketones, such as acetone and methyl ethyl ketone; esters, such as ethyl acetate; N-methyl-2-pyrrolidone (NMP); and the like.

When the paint composition of the present invention contains a blocked polyisocyanate compound described above as the crosslinking agent (A2), the proportion of the blocked polyisocyanate compound is preferably within the range of 5 to 60 parts by mass, more preferably 15 to 50 parts by mass, and still more preferably 25 to 45 parts by mass, per 100 parts by mass of the total solids content of the binder component, from the viewpoint of the finished appearance and scratch resistance of the resulting coating film.

When the paint composition of the present invention contains a polyisocyanate compound and/or a blocked polyisocyanate compound described above as the crosslinking agent (A2), the proportion is preferably such that the equivalent ratio (NCO/OH) of the total of the isocyanate groups (including blocked isocyanate groups) in the polyisocyanate compound and the blocked polyisocyanate compound to the hydroxy groups of the hydroxy-containing resin (A1) is usually within the range of 0.5 to 2, and particularly preferably 0.8 to 1.5, from the viewpoint of the water resistance and finished appearance of the resulting coating film.

Amino resins usable as the crosslinking agent (A2) include partially or fully methylolated amino resins obtained by a reaction of an amino component with an aldehyde component. Examples of amino components include melamine, urea, benzoguanamine, acetoguanamine, steroguanamine, spiroguanamine, dicyandiamide, and the like. Examples of aldehyde components include formaldehyde, paraformaldehyde, acetaldehyde, benzaldehyde, and the like.

Also usable are those obtained by etherifying some or all of the methylol groups of the above methylolated amino resins with a suitable alcohol. Examples of alcohols usable for etherification include methyl alcohol, ethyl alcohol, n-propyl alcohol, isopropyl alcohol, n-butyl alcohol, isobutyl alcohol, 2-ethylbutanol, 2-ethylhexanol, and the like.

Preferred amino resins are melamine resins. Examples of usable melamine resins include alkyl-etherified melamine resins obtained by etherifying some or all of the methylol groups of partially or fully methylolated melamine resins with the alcohol.

Preferable examples of alkyl-etherified melamine resins include methyl-etherified melamine resins obtained by etherifying some or all of the methylol groups of partially or fully methylolated melamine resins with methyl alcohol; butyl-etherified melamine resins obtained by etherifying some or all of the methylol groups of partially or fully methylolated melamine resins with butyl alcohol; methyl-butyl mixed etherified melamine resins obtained by etherifying some or all of the methylol groups of partially or fully methylolated melamine resins with methyl alcohol and butyl alcohol; and the like.

The melamine resin has a weight average molecular weight of preferably 400 to 6000, more preferably 500 to 5000, and still more preferably 800 to 4000.

A commercially available product can be used as the melamine resin. Examples of the commercially available product include Cymel 202, Cymel 203, Cymel 238, Cymel 251, Cymel 303, Cymel 323, Cymel 324, Cymel 325, Cymel 327, Cymel 350, Cymel 385, Cymel 1156, Cymel 1158, Cymel 1116, Cymel 1130, (all produced by Allnex Japan Inc.), U-VAN 120, U-VAN 20HS, U-VAN 20SE60, U-VAN 2021, U-VAN 2028, U-VAN 28-60 (all produced by Mitsui Chemicals, Inc.), and the like.

The melamine resins described above may be used singly, or in a combination of two or more.

When the paint composition of the present invention contains an amino resin described above as the crosslinking agent (A2), its proportion is preferably within the range of 0.5 to 40 parts by mass, more preferably 1.0 to 15 parts by mass, still more preferably 1.5 to 10 parts by mass, and even more preferably 1.5 to 5 parts by mass, per 100 parts by mass of the total solids content of the binder component, from the viewpoint of the water resistance and finished appearance of the resulting coating The crosslinking agents (A2) may be used singly, or in a combination of two or more.

Rheology Control Agent

In general, it is preferable for a paint composition to have a low viscosity when the shear rate is high, such as during atomization, and a high viscosity when the shear rate is low, such as during coating (e.g., by a coating method such as air spray coating, airless spray coating, rotary atomization coating); this is because such a paint composition can form a coating film with an excellent appearance. Specifically, a paint with a viscosity that decreases along with an increase in shear rate is preferable. A rheology control agent is a component added to a paint composition in order to develop a desired viscosity accordingly.

First Rheology Control Agent (B)

The first rheology control agent (B) is a non-aqueous dispersion resin (b).

The non-aqueous dispersion resin (b) is present in an insoluble state (opaque state) in the paint composition.

The non-aqueous dispersion resin (b) has a structure with a core portion and a shell portion.

The non-aqueous dispersion resin (b) is preferably acrylic resin particles (b3) obtained by dispersion polymerization of at least one polymerizable unsaturated monomer (b2) in the presence of a polymer dispersion stabilizer (b1) and an organic solvent. The polymer dispersion stabilizer (b1) serves as a shell portion while the acrylic resin particle (b3) obtained by dispersion polymerization of at least one polymerizable unsaturated monomer (b2) serves as a core portion.

The polymer dispersion stabilizer (b1) for use is preferably a copolymer (b1-1) obtained by copolymerization of long-chain unsaturated monomers and optionally other unsaturated monomers.

The long-chain unsaturated monomers can be appropriately selected according to the desired coating film properties. From the viewpoint of the copolymerizability and the solubility in an organic solvent, the following are preferable examples of the long-chain unsaturated monomers.

Examples include n-butyl(meth)acrylate, isobutyl(meth)acrylate, t-butyl(meth) acrylate, 2-ethylhexyl(meth)acrylate, cyclohexyl(meth)acrylate, n-octyl(meth)acrylate, lauryl (meth)acrylate, tridecyl(meth)acrylate, stearyl(meth) acrylate, and like $C_{4-18}$ alkyl or cycloalkyl esters of (meth)acrylic acid; methoxybutyl(meth) acrylate, methoxyethyl(meth)acrylate, ethoxybutyl(meth)acrylate, and like alkoxy alkyl esters of (meth)acrylic acid; benzyl(meth)acrylate, and like esters of aromatic alcohol with (meth)acrylic acid; adducts of hydroxy alkyl ester of glycidyl (meth)acrylate or (meth) acrylic acid with a monocarboxylic acid compound, such as capric acid, lauric acid, linoleic acid, and oleic acid; adducts of (meth)acrylic acid with a monoepoxy compound, such as Cardura E10; styrene, α-methylstyrene, vinyltoluene, p-chlorostyrene, p-t-butylstyrene, and like vinyl aromatic compounds; mono- or di-ester compounds of α,β-unsaturated carboxylic acid other than (meth)acrylic acids, such as itaconic acid, itaconic acid anhydride, crotonic acid, maleic acid, maleic acid anhydride, fumaric acid, and citraconic acid, with $C_{4-18}$ monohydric alcohol, such as butyl alcohol, pentyl alcohol, heptyl alcohol, octyl alcohol, and stearyl alcohol; Viscoat 8F, Viscoat 8FM, Viscoat 3F, and Viscoat 3FM (trade names, all produced by Osaka Organic Chemical Industry Co., Ltd., (meth)acrylate compounds having a fluorine atom in the side chain), perfluorocyclohexyl(meth) acrylate, perfluorohexylethylene, and like fluorine-containing compounds.

Of these, from the viewpoint of sag resistance during coating, at least one kind of the long-chain unsaturated monomer for use is preferably a $C_{4-18}$ alkyl ester of (meth) acrylic acid, and more preferably a $C_{6-18}$ alkyl ester of (meth)acrylic acid.

Specific examples of the $C_{4-18}$ alkyl ester of (meth)acrylic acid include n-butyl(meth)acrylate, isobutyl(meth) acrylate, t-butyl(meth) acrylate, 2-ethylhexyl(meth)acrylate, n-octyl (meth)acrylate, lauryl(meth)acrylate, tridecyl(meth)acrylate, stearyl(meth)acrylate, and the like.

Specific examples of the $C_{6-18}$ alkyl ester of (meth)acrylic acid include 2-ethylhexyl(meth)acrylate, n-cetyl(meth) acrylate, lauryl(meth) acrylate, tridecyl(meth) acrylate, stearyl(meth)acrylate, and the like.

Of these, 2-ethylhexyl (meth)acrylate is suitably used from the viewpoint of dispersion stability.

The unsaturated monomers optionally used for polymerization of the copolymer (b1-1) other than long-chain unsaturated monomers may be any unsaturated monomers other than the long-chain unsaturated monomers listed above. Examples include methyl(meth)acrylate, ethyl(meth) acrylate, propyl(meth)acrylate, and like $C_{1-3}$ alkyl esters of (meth)acrylic acid; adducts of glycidyl (meth)acrylate with $C_{2-3}$ monocarboxylic acid compounds, such as acetic acid and propionic acid; mono- or di-ester compounds of α,β-unsaturated carboxylic acid other than (meth)acrylic acid, such as itaconic acid, itaconic acid anhydride, crotonic acid, maleic acid, maleic acid anhydride, fumaric acid, and citraconic acid, with $C_{1-3}$ monohydric alcohol, such as methyl alcohol and propyl alcohol; (meth)acrylonitrile, and like cyano group-containing unsaturated compounds; vinyl acetate and like vinyl ester compounds; ethyl vinyl ether, methyl vinyl ether, and like vinyl ether compounds; ethylene, propylene, vinyl chloride, vinylidene chloride, and like α-olefin compounds, and the like. Examples of unsaturated monomers other than long-chain unsaturated monomers also include those in which the unsaturated monomers listed above are substituted with a hydroxyl group or the like, such as 2-hydroxyethyl (meth)acrylate.

The polymerization for producing the copolymer (b1-1) can usually be performed by using a radical polymerization initiator. Examples of radical polymerization initiators include 2,2'-azobisisobutyronitrile, 2,2'-azobis(2,4-dimethylvaleronitrile), and like azo-based initiators; benzoyl peroxide, lauryl peroxide, t-butyl peroctoate, t-butyl peroxy-2-ethylhexanoate, and like peroxide-based initiators; and the like. These polymerization initiators can generally be used in an amount ranging from about 0.2 to 10 parts by mass, preferably about 0.5 to 5 parts by mass, per 100 parts by mass of the monomers used in polymerization. The reaction temperature during the polymerization is usually about 60 to 160° C., and the reaction time of the polymerization is usually about 1 to 15 hours.

The copolymer (b1-1) usually has a weight average molecular weight of about 5000 to 100000, and preferably about 5000 to 50000. The copolymer for use as a dispersion stabilizer preferably has a molecular weight within this range so as to stabilize dispersed particles, thus suppress aggregation and precipitation, and thereby obtain an easy-to-handle paint composition with a viscosity that is not overly high.

The copolymer (b1-1) can be used singly or in a combination of two or more. Other than the copolymer (b1-1), the polymer dispersion stabilizer (b1) for use may be another dispersion stabilizer (b1-2), if necessary.

Examples of the dispersion stabilizer (b1-2) include the following (1) to (7):

(1) A polyester macromonomer in which a self-condensed polyester of fatty acid containing a hydroxy group, such as hydroxy acid, and glycidyl acrylate or glycidyl methacrylate are added to introduce about 1.0 polymerizable unsaturated group into the molecule.

(2) A comb polymer obtained by copolymerizing the polyester macromonomer (1) with methyl methacrylate and/or other (meth)acrylic acid esters and vinyl monomers.

(3) A product obtained by copolymerizing the polymer (2) with a small amount of glycidyl(meth)acrylate, and then adding (meth)acrylic acid to the glycidyl group to introduce a unsaturated group.

(4) An alkyl melamine resin.

(5) An alkyd resin having a fatty acid content of 15% or more and/or a product obtained by introducing a polymerizable unsaturated group into the alkyd resin. Examples of the method for introducing a polymerizable unsaturated group include a method of adding glycidyl (meth)acrylate to the carboxy group of the alkyd resin.

(6) An oil-free polyester resin, an alkyd resin having a fatty acid content of 15% or more, and/or a product obtained by introducing a polymerizable unsaturated group thereto.

(7) Cellulose acetate butyrate to which a polymerizable unsaturated group is introduced. Examples of the method for introducing a polymerizable unsaturated group include a method of adding isocyanate ethyl methacrylate to cellulose acetate butyrate.

The another dispersion stabilizer (b1-2) for use is preferably the dispersion stabilizer (3) above from the viewpoint of dispersion stability and storage stability, and the self-condensed polyester for use, which is a constituent component, is preferably a fatty acid having a hydroxyalkyl group having 10 to 25 carbon atoms in the alkyl chain. In particular, the fatty acid for use is preferably 12-hydroxystearic acid from the viewpoint of dispersion stability. When the another dispersion stabilizer (b1-2) contains the fatty acid, the content of fatty acid is preferably 0.1 to 30.0 mas %, and more preferably 1.0 to 25.0 mass %, based on the total amount of the polymerizable unsaturated monomer components that constitute the shell portion.

It is preferable to use a catalyst for the self-condensation of the fatty acid. Examples of the catalyst include sulfuric acid, paratoluenesulfonic acid, methanesulfonic acid, hydrochloric acid, phosphoric acid, and the like.

When the copolymer (b1-1) and the another dispersion stabilizer (b1-2) are used in combination as the polymer dispersion stabilizer (b1), the mass ratio of the copolymer (b1-1) to the another dispersion stabilizer (b1-2) is preferably 99/1 to 20/80, and more preferably 85/15 to 40/60 from the viewpoint of dispersion stability and sag resistance during coating.

The organic solvent usable in the above polymerization may be those that do not substantially dissolve the acrylic resin particles (b3) produced in the polymerization, but that can serve as a good solvent for the polymer dispersion stabilizer (b1) and the polymerizable unsaturated monomer (b2). Specific examples of such organic solvents include aliphatic hydrocarbon-based solvents, such as hexane, heptane, and octane; aromatic hydrocarbon-based solvents, such as benzene, toluene, xylene, Swasol 1000 (trade name, produced by Cosmo Oil Co., Ltd., an oil-based high-boiling-point solvent); alcohol-based solvents, such as isopropanol, n-butanol, iso-butanol, and 2-ethyl hexanol; ether-based solvents, such as cellosolve, butyl cellosolve, and diethylene glycol monobutyl ether; ketone-based solvents, such as methyl isobutyl ketone, diisobutyl ketone, methyl ethyl ketone, methyl hexyl ketone, and ethyl butyl ketone; ester-based solvents, such as ethyl acetate, isobutyl acetate, amyl acetate, and 2-ethylhexyl acetate; and the like. These organic solvents can be used singly or in a combination of two or more.

The polymerizable unsaturated monomer (b2) is preferably an unsaturated monomer that has excellent polymerizability and a carbon number smaller than that of the monomer used as the monomer component of the polymer dispersion stabilizer (b1) because such a monomer is easily formed into dispersion polymer particles.

Examples of such polymerizable unsaturated monomers include methyl(meth)acrylate, ethyl(meth)acrylate, propyl (meth)acrylate, n-butyl(meth)acrylate, isobutyl(meth)acrylate, t-butyl(meth)acrylate, 2-ethylhexyl(meth)acrylate, cyclohexyl(meth)acrylate, n-octyl(meth)acrylate, lauryl (meth)acrylate, tridecyl(meth)acrylate, stearyl(meth)acrylate, and like $C_{1-18}$ alkyl or cycloalkyl esters of (meth)acrylic acid; 2-hydroxyethyl(meth) acrylate, 2-hydroxypropyl (meth) acrylate, 3-hydroxypropyl(meth)acrylate, 4-hydroxybutyl(meth)acrylate, and like monoesterified products of (meth)acrylic acids with $C_{2-8}$ dihydric alcohols; methoxybutyl(meth) acrylate, methoxyethyl(meth)acrylate, ethoxybutyl(meth)acrylate, and like alkoxy alkyl esters of (meth) acrylic acid; benzyl(meth)acrylate, and like esters of aromatic alcohols with (meth)acrylic acids; adducts of glycidyl (meth)acrylate with $C_{2-18}$ monocarboxylic acid compounds, such as acetic acid, propionic acid, oleic acid, and p-t-butyl benzoic acid; adducts of (meth)acrylic acid with monoepoxy compounds, such as Cardura E10; styrene, α-methylstyrene, vinyltoluene, p-chlorostyrene, p-t-butyl styrene, and like vinyl aromatic compounds; mono- or di-ester compounds of α,β-unsaturated carboxylic acid other than (meth)acrylic acid, such as itaconic acid, itaconic acid anhydride, crotonic acid, maleic acid, maleic acid anhydride, fumaric acid, and citraccnic acid, with $C_{1-18}$ monohydric alcohol, such as methyl alcohol, butyl alcohol, hexyl alcohol, and stearyl alcohol; Viscoat 8F, Viscoat 8FM, Viscoat 3F, and Viscoat 3FM (trade names, all produced by Osaka Organic Chemical Industry Co., Ltd., (meth)acrylate compounds having a fluorine atom in the side chain), perfluorocyclohexyl(meth) acrylate, perfluorohexylethylene, and like fluorine-containing compounds; (meth)acrylonitrile, and like cyano group-containing unsaturated compounds; vinyl acetate, vinyl benzoate, VEOVA (produced by Shell Chemicals) and like vinyl ester compounds; n-butyl vinyl ether, ethyl vinyl ether, methyl vinyl ether, and like vinyl ether compounds; di(meth)acrylate of 1,6-hexanediol, tri (meth)acrylate of trimethylolpropane, divinylbenzene, and like polyvinyl compounds; and ethylene, propylene, vinyl chloride, vinylidene chloride, and like α-olefin compounds.

The polymerizable unsaturated monomer (b2), which forms the acrylic resin particles (b3), can stably form particle components by using a monomer with a carbon number smaller than that of the monomer component used in the polymer dispersion stabilizer (b1), as described above. From this viewpoint, it is preferable to contain a (meth) acrylic acid ester compound having 8 or less carbon atoms, preferably 4 or less carbon atoms, a vinyl aromatic compound, (meth)acrylonitrile, a hydroxy-containing polymerizable unsaturated monomer, an acid group-containing polymerizable unsaturated monomer, and the like. Of these, it is particularly preferable to contain hydroxyethyl (meth) acrylic acid ester. Moreover, when a hydroxy-containing polymerizable unsaturated monomer is contained as a constituent of the core portion, the content of the hydroxy-containing polymerizable unsaturated monomer is preferably 1 to 60 mass %, more preferably 10 to 55 mass %, and particularly preferably 15 to 50 mass %, based on the total amount of the polymerizable unsaturated monomer components that constitute the non-aqueous dispersion resin.

The polymerization of the polymerizable unsaturated monomer (b2) is usually performed using a radical polymerization initiator. Examples of usable radical polymerization initiators include 2,2'-azobisisobutyronitrile, 2,2'-azobis(2,4-dimethylvaleronitrile), and like azo-based initiators; benzoyl peroxide, lauryl peroxide, t-butyl peroctoate, t-butyl peroxy-2-ethylhexanoate, and like peroxide-based initiators; and the like. These polymerization initiators can generally be used in an amount ranging from about 0.2 to 10 parts by mass, preferably about 0.5 to 5 parts by mass, per 100 parts by mass of the monomers used in polymerization.

The mass ratio of the polymer dispersion stabilizer (b1) to the polymerizable unsaturated monomer (b2) used in the above polymerization, i.e., the polymer dispersion stabilizer (b1)/the polymerizable unsaturated monomer (b2), is preferably 10/90 to 60/40, and more preferably 20/80 to 50/50.

The total concentration of the polymer dispersion stabilizer (b1) and the polymerizable unsaturated monomer (b2) in the organic solvent is usually about 30 to 70 mass %, and preferably about 30 to 60 mass %. The polymerization can be performed by a known method. The reaction temperature during the polymerization is usually about 60 to 160° C., and the reaction time of the polymerization is usually about 1 to 15 hours.

The polymerization reaction performed as above can produce a stable dispersion of the non-aqueous dispersion resin (b) whose liquid phase is an organic solvent in which the polymer dispersion stabilizer (b1) is dissolved and whose solid phase comprises the acrylic resin particles (b3) obtained by polymerizing the polymerizable unsaturated monomer (b2). The non-aqueous dispersion resin (b) usually has an average particle size of about 0.1 to 1.0 μm. The average particle size of the non-aqueous dispersion resin (b) is preferably adjusted within this range because the viscosity of the non-aqueous dispersion is not overly high, and the swelling or aggregation of the non-aqueous dispersion resin (b) during storage of the paint can be alleviated.

The particle size of the non-aqueous dispersion resin (b) is measured by a Coulter N4 Submicron Particle Size Analyzer (trade name, produced by Beckman Coulter, Inc.).

In the production of the non-aqueous dispersion resin (b), the polymer dispersion stabilizer (b1) is preferably bound to the acrylic resin particles (b3) to improve the storage stability and mechanical properties.

Binding of the polymer dispersion stabilizer (b1) to the acrylic resin particles (b3) can be conducted by, for example, preliminarily performing, in the production the polymer dispersion stabilizer (b1), copolymerization of the monomer component having a functional group, such as hydroxy, acid, acid anhydride, epoxy, methylol, isocyanate, amide, amino, and other groups, as part of the monomers that form the polymer dispersion stabilizer (b1); and using a monomer having a functional group, such as hydroxy, acid, acid anhydride, epoxy, methylol, isocyanate, amide, amino, and other groups, which can react with the above functional groups, as part of the polymerizable unsaturated monomer (b2), which forms the acrylic resin particles (b3). Examples of such combinations include an isocyanate group with a hydroxy group, an isocyanate group with a methylol group, an epoxy group with an acid (anhydrous) group, an epoxy group with an amino group, an isocyanate group with an amide group, an acid (anhydrous) group with a hydroxy group, and other combinations.

Examples of such monomers having a functional group include (meth)acrylic acid, crotonic acid, maleic acid, maleic acid anhydride, itaconic acid, itaconic acid anhydride, fumaric acid, citraconic acid, and like α,β-ethylenically unsaturated carboxylic acids; glycidyl(meth)acrylate, vinyl glycidyl ether, allyl glycidyl ether, and like glycidyl group-containing compounds; (meth)acrylamide, N,N-dimethyl (meth)acrylamide, N-alkoxymethyl (meth)acrylamide, diacetone acrylamide, N-methylol (meth)acrylamide, and like carboxylic acid amide compounds; p-styrene sulfonamide, N-methyl-p-styrene sulfonamide, N,N-dimethyl-p-styrene sulfonamide, and like sulfonic acid amide group-containing compounds; t-butylaminoethyl(meth)acrylate, and like amino group-containing compounds; condensation product of 2-hydroxyethyl (meth)acrylate and phosphoric acid or a phosphoric acid ester compound; compounds in which phosphoric acid or a phosphoric acid ester compound is added to the glycidyl group of a compound having a glycidyl group, such as glycidyl(meth)acrylate, and like phosphate group-containing compounds; 2-acrylamide-2-methyl-propanesulfonic acid, and like sulfonic acid group-containing compounds; equimolar adducts of m-isopropenyl-α,α-dimethylbenzyl isocyanate, isophorone diisocyanate or tolvlene diisocyanate with hydroxy (meth) acrylate; isccyanoethyl methacrylate, and like isocvanate group-containing compounds and the like.

Another method for binding the polymer dispersion stabilizer (b1) to the acrylic resin particles (b3) may comprise polymerizing unsaturated monomers in the presence of the polymer dispersion stabilizer (b1) that has a polymerizable double bond.

The introduction of a pclymerizable double bond into the polymer dispersion stabilizer (b1) can be performed by, for example, using an acid group-containing monomer, such as carboxylic acid, phosphoric acid, or sulfonic acid, as a copolymerization component of the acrylic resin particles (b3), and reacting the acid group with a glycidyl group-containing unsaturated monomer, such as glycidyl (meth) acrylate or allylglycidyl ether. The polymer dispersion stabilizer (b1) may alternatively contain a glycidyl group to undergo a reaction with an acid group-containing unsaturated monomer.

The reaction of the glycidyl group-containing monomer with the carboxylic acid group-containing unsaturated monomer can usually be carried out in the presence of a polymerization inhibitor under conditions in which the epoxy group and the carboxylic acid group react smoothly without causing reaction problems such as gelation. The reaction is suitably performed heating at 120 to 170° C. for 3 to 15 hours. In this reaction, esterification reaction catalysts, such as tertiary amines (e.g., dimethylaminoethanol) and quaternary ammonium salts (e.g., tetraethylammonium bromide and tetrabutylammonium bromide), can be used, and inert organic solvents can also be used.

Examples of the polymerization inhibitors include hydroxy compounds, such as hydroquinone, hydroquinone monomethyl ether, pyrocatechol, and p-t-butylcatechol; nitro compounds, such as nitrobenzene, nitrobenzoic acid, o-, m-, or p-dinitrobenzene, 2,4-dinitrotoluene, 2,4-dinitrophenol, trinitrobenzene, and picric acid; quinone compounds, such as p-benzoquinone, dichlorobenzoquinone, chloranll, anthraquinone, and phenanthraquinone; nitroso compounds, such as nitrosobenzene and nitroso-β-naphthol; and other radical polymerization inhibitors. These can be used singly or in a combination of two or more.

Still another method for binding the polymer dispersion stabilizer (b1) to the acrylic resin particles (b3) may comprise producing a non-aqueous dispersion containing the polymer dispersion stabilizer (b1) and the acrylic resin particles (b3) into which functional groups that do not react with each other are respectively introduced, and then subjecting the produced non-aqueous dispersion to a reaction with a binder that binds the polymer dispersion stabilizer (b1) to the acrylic resin particles (b3).

Specifically, for example, a hydroxy-containing unsaturated monomer alone, or a mixture of a hydroxy-containing unsaturated monomer with another unsaturated monomer is polymerized in the presence of a hydroxy-containing polymer dispersion stabilizer and an organic solvent to produce a non-aqueous dispersion in which both components have a hydroxy group. Thereafter, a polyisocyanate compound is added to the produced non-aqueous dispersion to allow a reaction to occur at ordinary temperature for several hours to several days, and at about 60 to 100° C. for about 1 to 5 hours.

The usable polyisocyanate compounds are those having at least two isocyanate groups per molecule, and examples include tolylene diisocyanate, xylylene diisocyanate, 4,4'-diphenylmethane diisocyanate, and like aromatic diisocyanates or hydrides thereof; hexamethylene diisocyanate, lysine diisocyanate, diner acid (dimerization products of tall oil fatty acid) diisocyanate, and like aliphatic diisocyanates; isophorone diisocyanate and like alicyclic diisocyanates; and the like.

In addition to the above, it is also possible to use, for example, a combination of an acid group-containing polymer dispersion stabilizer (b1), the acrylic resin particles (b3), and polyepoxide; a combination of an epoxy-containing polymer dispersion stabilizer (b1), the acrylic resin particles (b3), and polycarboxylic acid; and a combination of an epoxy group- or isocyanate group-containing polymer dispersion stabilizer (b1), the acrylic resin particles (b3), and a polysulfide compound.

Examples of polyepoxide include bisphenol A-type epoxy resin, bisphenol F-type epoxy resin, novolac-type epoxy resin, epoxy group-containing acrylic resin, and the like. Examples of polycarboxylic acid include adipic acid, sebacic acid, azelaic acid, isophthalic acid, and the like. Examples of polysulfide include pentamethylene disulfide, hexamethylene disulfide, poly(ethylene disulfide), and the like.

As described above, the polymer dispersion stabilizer (b1) and the acrylic resin particles (b3) can be chemically bound to each other. In doing so, a sufficient amount of various functional groups and/or polymerizable double bonds introduced into the polymer dispersion stabilizer (b1) and/or the acrylic resin particles (b3) is such that the polymer dispersion stabilizer (b1) and/or the acrylic resin particles (b3) have, on average, at least 0.1 functional groups and/or polymerizable double bonds per molecule.

The mass ratio of the polymer dispersion stabilizer (b1) to the acrylic resin particles (b3) in the non-aqueous dispersion resin (b), i.e., the polymer dispersion stabilizer (b1)/the acrylic resin particles (b3), is preferably 90/10 to 10/90, and more preferably 80/20 to 30/70 from the viewpoint of storage stability.

The thus-obtained non-aqueous dispersion resin (b), in which the polymer dispersion stabilizer (b1) and the acrylic resin particles (b3) are chemically bound to each other, has excellent storage stability, and furthermore the resulting coating film exhibits excellent chemical and mechanical properties.

Second Rheology Control Agent (C)

The second rheology control agent (C) contains a reaction product of (c1) a polyisocyanate compound, (c2) a primary monoamine having a number average molecular weight of 300 or less, and (c3) a polyether amine having two or more amino groups and having a number average molecular weight of 1000 or more and less than 6000, wherein the proportion of the polyether amine having a number average molecular weight of 1000 or more and less than 6000 (c3) is within a range of 10 to 30 mass % based on the total amount of the components (c1) to (c3).

Polyisocyanate Compound (c1)

The polyisocyanate compound (c1) for use may be, for example, a polyisocyanate compound mentioned above in the description of the crosslinking agent (A2). The polyisocyanate compounds may be used singly, or in a combination of two or more.

The polyisocyanate compound (c1) is preferably an aliphatic polyisocyanate compound and/or a derivative thereof, more preferably an aliphatic diisocyanate compound and/or an isocyanurate thereof, from the viewpoint of the sag resistance during coating and the water blushing resistance and finished appearance of the resulting coating film. Among these, hexamethylene diisocyanate and/or an isocyanurate thereof is preferable, and hexamethylene diisocyanate is more preferable.

Primary Monoamine Having a Number Average Molecular Weight of 300 or Less (c2)

Examples of the primary monoamine having a number average molecular weight of 300 or less (c2) include benzylamine, ethylamine, n-propylamine, sec-propylamine, n-butylamine, sec-butylamine, tert-butylamine, n-pentylamine, α-methylbutylamine, α-ethylpropylamine, β-ethylbutylamine, hexylamine, octylamine, 2-ethylhexylamine, n-decylamine, 1-aminooctadecane (stearylamine), cyclohexylamine, aniline, 2-(2-aminoethoxy)ethanol, and the like. The primary monoamines (c2) may be used singly, or in a combination of two or more.

As the primary monoamine having a number average molecular weight of 300 or less (c2), a benzene ring-containing primary monoamine is preferable, and benzylamine is more preferable, from the viewpoint of sag resistance during coating and the water blushing resistance and finished appearance of the resulting coating film.

The number average molecular weight of the primary monoamine having a number average molecular weight of 300 or less (c2) is within the range of preferably 60 to 300, more preferably 75 to 250, and still more preferably 90 to 150, from the viewpoint of the sag resistance during coating, and the water blushing resistance and finished appearance of the resulting coating film.

Polyether Amine (c3)

The polyether amine (c3) is a polyether having two or more ether linkages per molecule, and is an amine having two or more amino groups and a number average molecular weight of 1000 or more and less than 6000.

In particular, the number average molecular weight of the polyether amine (c3) is within the range of preferably 1000 to 5000, more preferably 2000 to 5000, and still more preferably 2000 to 4000, from the viewpoint of the sag resistance during coating, and the water blushing resistance and finished appearance of the resulting coating film.

From the viewpoint of the sag resistance during coating, and the water blushing resistance and finished appearance of the resulting coating film, the polyether amine (c3) is preferably a primary amine.

The polyether amine (c3) has two or more amino groups. From the viewpoint of the sag resistance during coating, and the water blushing resistance and finished appearance of the resulting coating film, the polyether amine (c3) is more preferably at least one amine selected from the group consisting of a diamine and a triamine, and particularly preferably a triamine.

Therefore, from the viewpoint of the sag resistance during coating, and the water blushing resistance and finished appearance of the resulting coating film, the polyether amine (c3) is preferably at least one amine selected from the group consisting of a primary diamine and a primary triamine, and more preferably a primary triamine. In the present invention, the primary diamine is an amine having two —$NH_2$ groups, and the primary triamine is an amine having three —$NH_2$ groups.

As the polyether amine (c3), for example, a polyoxyalkylene-containing amine can be preferably used.

From the viewpoint of the sag resistance during coating, and the water blushing resistance and finished appearance of the resulting coating film, at least one amine compound selected from the group consisting of a polycxyalkylene-containing diamine represented by formula (1) below (c3-1) and a polyoxyalkylene-containing polyamine having three or more amino groups represented by formula (4) below (c3-2) can be preferably used as the polyoxyalkylene-containing amine.

Of these, the polyoxyalkylene-containing polyamine having three or more amino groups (c3-2) can be particularly preferably used from the viewpoint of the sag resistance during coating, and the water blushing resistance and finished appearance of the resulting coating film.

Polyoxyalkylene-Containing Diamine (c3-1)

The polyoxyalkylene-containing diamine (c3-1) is a polyoxyalkylene-containing diamine represented by formula (1) below.

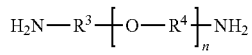

(1)

(wherein $R^3$ represents a $C_{2-6}$ alkylene group, preferably a $C_{2-4}$ alkylene group, more preferably at least one alkylene group selected from the group consisting of an ethylene group, a propylene group, and a tetramethylene group; $R^4$ represents a $C_{2-6}$ alkylene group, preferably a $C_{2-4}$ alkylene group, more preferably at least one alkylene group selected from the group consisting of an ethylene group, a propylene group, and a tetramethylene group; n represents an integer of 9 to 134, preferably 27 to 112, more preferably 27 to 89; n oxyalkylene units (O—$R^4$) may be the same or different; when the oxyalkylene units (O—$R^4$) are different from each other, the form of addition (polymerization form) of the oxyalkylene units (O—$R^4$) may be a random form, or a block form.)

Specifically, as the polyoxyalkylene-containing diamine (c3-1), a polyoxyalkylene-containing diamine represented by formula (2) below

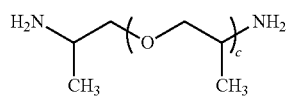

(2)

(wherein c represents an integer of 16 to 102, preferably 33 to 85, and more preferably 33 to 68)

and/or a polyoxyalkylene-containing diamine represented by formula (3) below

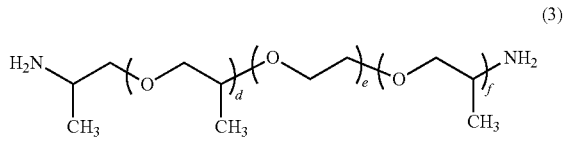

(3)

(wherein d and f each represent an integer of 1 to 20, preferably 2 to 15, more preferably 2 to 10; e represents an integer of 12 to 60, preferably 15 to 50, more preferably 25 to 45; d+f is within the range of 2 to 40, in particular, preferably 4 to 30, more preferably 4 to 20, even more preferably 4 to 8) can be preferably used.

A commercially available product can be used as the polyoxyalkylene-containing diamine (c3-1). Examples of commercially available products include JEFFAMINE D-2000 (number average molecular weight: 2000; in formula (2) above, c≈33), JEFFAMINE D-4000 (number average molecular weight: 4000; in formula (2) above, c≈68), JEFFAMINE ED-2003 (number average molecular weight: 2000; in formula (3) above, d+f≈6, e≈39), ELASTAMINE AT-1000 (number average molecular weight: 1000), and the like.

Polyoxyalkylene-Containing Polyamine (c3-2)

As the polyoxyalkylene-containing polyamine (c3-2), a polyoxyalkylene-containing polyamine having three or more amino groups represented by formula (4) below

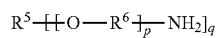

(4)

(wherein $R^5$ represents a q-valent organic group having a carbon atom at a bonding site with the oxygen atom indicated in the formula, preferably a q-valent hydrocarbon group; $R^6$ represents a $C_{2-6}$ alkylene group, preferably a $C_{2-4}$ alkylene group, more preferably at least one alkylene group selected from the group consisting of an ethylene group, a propylene group, and a tetramethylene group; p represents an integer of 4 to 45, preferably 10 to 40, more preferably 15 to 30; q represents an integer of 3 or more, preferably 3 to 6, more preferably 3 or 4; p oxyalkylene units (O—$R^6$) may be the same or different; when the oxyalkylene units (O—$R^6$) are different from each other, the form of addition (polymerization form) of the oxyalkylene units (O—$R^6$) may be a random form, or a block form), and/or polyoxyalkylene-containing triamine represented by formula (5) below

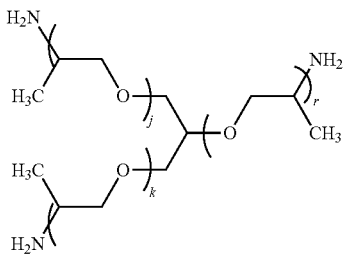

(5)

(wherein j, k, and r each represent an integer of 5 to 60, preferably 10 to 50, more preferably 10 to 40; in particular, j+k+r is preferably within the range of 17 to 102, more preferably 33 to 86, and still more preferably 33 to 68) can be preferably used.

A commercially available product can be used as the polyoxyalkylene-containing polyamine (c3-3). Examples of commercially available products include JEFFAMINE T-3000 (number average molecular weight: 3000; in formula (5) above, j+k+r≈50), JEFFAMINE T-5000 (number average molecular weight: 5000; in formula (5) above, j+k+r≈85), and the like.

Reaction Method

The reaction of the polyisocyanate compound (c1), the primary monoamine having a number average molecular weight of 300 or less (c2), and the polyether amine (c3) can be generally performed by mixing the components (c1) to (c3) according to a freely selected method at, if necessary, elevated temperature. The reaction is suitably performed at a temperature of 5° C. to 80° C., and preferably 10° C. to 60° C.

Through this reaction, the carbonyls of the polyisocyanate compound (c1) and the amines of the primary monoamine having a number average molecular weight of 300 or less (c2) and the polyether amine (c3) form urea linkages, thus forming a cross-linked structure.

Typically, the components (c1) to (c3) can be mixed by a freely selected method. For example, the components (c1) to (c3) can be mixed by concurrently adding a mixture of the primary monoamine (c2) and the polyether amine (c3) and the polyisocyanate compound (c1) dropwise to a reaction vessel, or by adding the polyisocyanate compound (c1) dropwise to a mixture of the primary monoamine (c2) and the polyether amine (c3). If necessary, the components may be mixed in several stages. The reaction of the components (c1) to (c3) is preferably performed in the presence of an organic solvent.

Examples of organic solvents include toluene, xylene, Swasol 1000 (trade name, produced by Cosmo Oil Co., Ltd., an oil-based high-boiling-point solvent), and like aromatic solvents; mineral spirit and like aliphatic solvents; ethyl acetate, butyl acetate, propyl propionate, butyl propionate, 1-methoxy-2-propyl acetate, 2-ethoxyethyl propionate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; isopropanol, n-butanol, iso-butanol, 2-ethylhexanol, and like alcohol-based solvents; and the like.

Regarding the proportion of the components (c1) to (c3) in reacting the components (c1) to (c3), the proportion of the polyether amine (c3) is within the range of 10 to 30 mass % based on the total amount of the components (c1) to (c3) from the viewpoint of the sag resistance during coating, and the water blushing resistance and finished appearance of the resulting coating film.

Upon the reaction of the components (c1) to (c3), the proportions of the components (c1) to (c3) are preferably within the following ranges based on the total amount of the components (c1) to (c3) from the viewpoint of the sag resistance during coating, and the water blushing resistance and the finished appearance of the resulting coating film:
Polyisocyanate compound (c1): 30 to 60 mass %, preferably 30 to 55 mass %, and more preferably 30 to 45 mass %;
Primary monoamine having a number average molecular weight of 300 or less (c2): 30 to 60 mass %, preferably 35 to 60 mass %, and more preferably 35 to 55 mass %; and
Polyether amine (c3): 10 to 30 mass %, preferably more than 15 mass % and 30 mass % or less, and more preferably 18 to 28 mass %.

Upon the reaction of the components (c1) to (c3), the ratio of the total number of amino groups in the primary monoamine (c2) and the polyether amine (c3) to the number of isocyanate groups in the polyisocyanate compound (c1) (amino groups/isocyanate groups) is within the range of preferably 0.7 to 1.5, more preferably 0.9 to 1.1, and still more preferably 0.95 to 1.05, from the viewpoint of sag resistance during coating, and water blushing resistance and finished appearance of the resulting coating film.

In the present invention, the second rheology control agent (C) may contain a reaction product of the polyisocyanate compound (c1) and the primary monoamine (c2), or a reaction product of the polyisocyanate compound (c1) and the polyether amine (c3), other than the reaction product of the polyisocyanate compound (c1), the primary monoamine (c2), and the polyether amine (c3).

Moreover, the reaction of the components (c1) to (c3) is preferably performed in the presence of a resin component, from the viewpoint of suppressing the aggregation of the reaction product.

Examples of resin components used in the reaction of the components (c1) to (c3) include acrylic resins, polyester resins, polyether resins, polycarbonate resins, polyurethane resins, epoxy resins, alkyd resins, and the like. Of these, acrylic resins are preferable from the viewpoint of sag resistance during coating, and water blushing resistance and finished appearance of the resulting coating film. The resin component may be a binder component (A), or a resin component that is different from the binder component (A). Preferably, a film-forming resin, such as the secondary-hydroxy-containing acrylic resin (A1-1a) described above, other than the hydroxy- and alkoxysilyl-containing acrylic resin (A1-1b) described above, and the secondary-hydroxy- and alkoxysilyl-containing acrylic resin (A1-1c) described above, is used as the resin component.

When the reaction of the components (c1) to (c3) is performed in the presence of the resin component, the mixing ratio of the components (c1) to (c3) to the resin component is preferably such that the ratio of the total mass of the components (c1) to (c3) to the mass of the resin component, i.e., the ratio of (the total mass of the components (c1) to (c3))/(mass of the resin component), is preferably within the range of 1/99 to 15/85, and more preferably 2/98 to 12/88.

When the reaction of the components (c1) to (c3) is performed in the presence of the resin component, the resin component is not included in the second rheology control agent (C).

Paint Composition

The paint composition of the present invention (sometimes simply referred to below as "the paint of the present invention") is a paint composition containing the binder component (A), the first rheology control agent (B), and the second rheology control agent (C).

From the viewpoint of the sag resistance during coating of the paint composition and the finished appearance of the resulting coating film, the content of the first rheology control agent (B) in the paint composition of the present invention is preferably within the range of 0.5 to 10 parts by mass, and more preferably 1 to 8 parts by mass, per 100 parts by mass of the total solids content of the binder component (A) and the first rheology control agent (B).

From the viewpoint of the sag resistance during coating and the water blushing resistance and finished appearance of the resulting coating film, the content of the second rheology control agent (C) in the paint composition of the present invention is preferably within the range of 0.05 to 1 parts by mass, more preferably 0.1 to 0.9 parts by mass, and still more preferably 0.15 to 0.8 parts by mass, per 100 parts by mass of the total solids content of the binder component (A) and the first rheology control agent (B).

The paint composition of the present invention has excellent sag resistance during coating, and is capable of forming a coating film having excellent finished appearance and water blushing resistance. For example, this is because the second rheology control agent (C) is used, and because the first rheology control agent (B) and the second rheology control agent (C) are used in combination.

The second rheology control agent (C) is a reaction product of the polyisocyanate compound (c1), the primary monoamine having a number average molecular weight of 300 or less (c2), and the polyether amine having two or more amino groups and having a number average molecular weight of 1000 or more and less than 6000 (c3). it is assumed that this second rheology control agent (C) contained in the paint composition serves as a rheology control agent with a fine crystalline structure and forms a dense network in the paint composition to exert sag control capability, thus improving the sag resistance during coating and the finished appearance of the resulting coating film. Further, the fine crystalline structure improves the solubility during the coating film formation; therefore, a coating film excellent in water blushing resistance is formed.

Furthermore, the first rheology control agent (B) and the second rheology control agent (C) when used in combination are assumed to form two networks with different dissolution temperatures in the paint composition, thus improving the flowability, and further improving the finished appearance while ensuring sag control capability.

The paint composition of the present invention may further contain, if necessary, color pigments, effect pigments, dyes, or the like. The paint composition of the present invention may also further contain extender pigments, ultraviolet absorbers, light stabilizers, catalysts, antifoaming agents, rheology control agents other than the first rheology control agent (B) and the second rheology control agent (C), anticorrosives, surface-adjusting agents, organic solvents, and the like.

Examples of color pigments include titanium oxide, zinc white, carbon black, cadmium red, molybdenum red, chrome yellow, chromium oxide, Prussian blue, cobalt blue, azo pigments, phthalocyanine pigments, quinacridone pigments, isoindoline pigments, threne pigments, perylene pigments, and the like.

Examples of effect pigments include aluminum powder, mica powder, titanium oxide-coated mica powder, and the like.

Examples of extender pigments include talc, clay, kaolin, baryta, barium sulfate, barium carbonate, calcium carbonate, alumina white, and the like.

The above pigments may be used singly, or in a combination of two or more.

When the paint composition of the present invention is used as a clear paint and contains a pigment, the pigment is preferably used in such an amount that the transparency of the resulting coating film is not impaired. For example, the content of the pigment is preferably within the range of 0.1 to 20 mass %, more preferably 0.3 to 10 mass %, and particularly preferably 0.5 to 5 mass %, based on the total solids content in the paint composition.

When the paint composition of the present invention is used as a colored paint and contains a pigment, the content of the pigment is preferably within the range of 1 to 200 mass %, more preferably 2 to 100 mass %, and particularly preferably 5 to 50 mass %, based on the total solids content in the paint composition.

"Solids content" as used herein refers to the non-volatile components of the resin, curing agent, pigment, and the like remaining in the paint composition after drying the paint composition at 110° C. for 1 hour. For example, the total solids content of the paint composition can be calculated as follows. The paint composition is measured in a heat-resistant container such as an aluminum foil cup, spread at the bottom of the container, and then dried at 110° C. for 1 hour, after which the mass of the components in the paint composition remaining after drying is measured to determine the ratio of the mass of the components remaining after drying with respect to the total mass of the paint composition before drying.

Examples of ultraviolet absorbers include known ultraviolet absorbers, such as benzotriazole absorbers, triazine absorbers, salicylic acid derivative absorbers, benzophenone absorbers, and like ultraviolet absorbers. These ultraviolet absorbers may be used singly, or in a combination of two or more.

When the paint composition of the present invention contains an ultraviolet absorber, the content of the ultraviolet absorber is preferably within the range of 0.1 to 10 mass %, more preferably 0.2 to 5 mass %, and particularly preferably 0.3 to 2 mass %, based on the total solids content in the paint composition.

Examples of light stabilizers include known light stabilizers, such as hindered amine light stabilizers.

The hindered amine light stabilizer for use is preferably a hindered amine light stabilizer having low basicity from the viewpoint of the pot life. Examples of such hindered amine light stabilizers include acylated hindered amines, amino ether-based hindered amines, and the like. Specific examples include HOSTAVIN 3058 (trade name, produced by Clariant), TINUVIN 123 (trade name, produced by BASF), and the like.

When the paint composition of the present invention contains a light stabilizer, the content of the light stabilizer is preferably within the range of 0.1 to 10 mass %, more preferably 0.2 to 5 mass %, and particularly preferably 0.3 to 2 mass %, based on the total solids content in the paint composition.

Examples of catalysts include known catalysts. For example, when the paint composition of the present invention contains the polyisocyanate compound and/or blocked polyisocyanate compound mentioned above as the crosslinking agent (A2), the paint composition of the present invention may contain a urethanization reaction catalyst.

Specific examples of urethanization reaction catalysts include organometallic compounds, such as tin octylate, dibutyltin diacetate, dibutyltin di(2-ethylhexanoate), dibutyltin dilaurate, dioctyltin diacetate, dioctyltin di(2-ethylhexanoate), dibutyltin oxide, dibutyltin sulfide, dioctyltin oxide, dibutyltin fatty acid salts, lead 2-ethylhexanoate, zinc octylate, zinc naphthenate, zinc fatty acid salts, bismuth octanoate, bismuth 2-ethylhexanoate, bismuth oleate, bismuth neodecanoate, bismuth versatate, bismuth naphthenate, cobalt naphthenate, calcium octylate, copper naphthenate, and tetra(2-ethylhexyl)titanate; tertiary amines; and the like. These may be used singly, or in a combination of two or more.

When the paint composition of the present invention contains a urethanization reaction catalyst described above, the content of the urethanization reaction catalyst is preferably within the range of 0.005 to 2 mass %, and more preferably 0.01 to 1 mass %, based on the total solids content in the paint composition of the present invention.

When the paint composition of the present invention contains a urethanization reaction catalyst described above, the paint composition of the present invention may contain acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, lauric acid, palmitic acid, stearic acid, oleic acid, linoleic acid, neodecanoic acid, versatic acid, isobutyric anhydride, itaconic anhydride, acetic anhydride, citraconic anhydride, propionic anhydride, maleic anhydride, butyric anhydride, citric anhydride, trimellitic anhydride, pyromellitic anhydride, phthalic anhydride, or like organic acid; hydrochloric acid, phosphoric acid, or like inorganic acid; acetylacetone, an imidazole compound, or like metal coordination compound; or the like, from the viewpoint of storage stability, curability, or the like.

When a melamine resin described above is used as the crosslinking agent (A2) in the paint composition of the present invention, the paint composition of the present invention may contain, as a curing catalyst, p-toluenesulfonic acid, dodecylbenzenesulfonic acid, dinonylnaphthalene sulfonic acid, or like sulfonic acid; monobutyl phosphate, dibutyl phosphate, mono(2-ethylhexyl) phosphate, di(2-ethylhexyl) phosphate, or like alkyl phosphoric esters; a salt of such an acid with an amine compound; or the like.

When the paint composition of the present invention contains a curing catalyst for the melamine resin, the content of the curing catalyst for the melamine resin is preferably within the range of 0.1 to 2 mass %, more preferably 0.2 to 1.7 mass %, and still more preferably 0.3 to 1.4 mass %, based on the total solids content in the paint composition of the present invention.

The substrate to be coated with the paint composition of the present invention is not particularly limited. Examples of the substrates include exterior panel parts of automotive bodies such as for passenger cars, trucks, motorcycles, and buses; automotive parts; exterior panel parts of household electric appliances such as cellular phones and audio equipment; and the like. The exterior panel parts of automotive bodies and automotive parts are particularly preferable.

The material for the substrate is not particularly limited. Examples include metallic materials, such as iron, aluminum, brass, copper, tin plate, stainless steel, galvanized steel, steel plated with a zinc alloy (Zn—Al, Zn—Ni, Zn—Fe, or the like); plastic materials, such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins, and various types of FRP; inorganic materials, such as glass, cement, and concrete; wood; textile materials (e.g., paper and cloth); and the like. Of these materials, metallic materials and plastic materials are preferable.

The substrate may be a metallic material mentioned above or, e.g., a vehicle body formed from a metallic material mentioned above that has been subjected to a surface treatment, such as a phosphoric acid salt treatment, chromate treatment, or composite oxide treatment. The substrate may also be a metallic material, vehicle body, or the like mentioned above on which an undercoating film of various electrodeposition paint has been formed. The substrate may also be a metallic material, vehicle body, or the like mentioned above on which an undercoating film of various electrodeposition paint has been formed, and an intermediate coating film has been further formed on the undercoating film. The substrate may also be a plastic material, such as a bumper, on which a primer coating film has been formed.

The method of applying a paint containing the paint composition of the present invention (sometimes simply referred to below as "the paint of the present invention") is not particularly limited. For example, air spray coating, airless spray coating, rotary atomization coating, curtain coating, or other coating methods can be used to form a wet coating film. In these coating methods, an electrostatic charge may be applied, if necessary. Of these methods, air spray coating or rotary atomization coating is particularly preferred. The paint of the present invention is usually preferably applied to a cured film thickness of 10 to 60 μm, and more preferably 25 to 55 μm. In particular, the cured film thickness is preferably 35 to 55 μm, and particularly preferably 41 to 50 μm.

When air-spray coating, airless spray coating, or rotary atomization coating is performed, it is preferred that the paint of the present invention be appropriately adjusted in advance by adding a solvent, such as an organic solvent, to have a viscosity suitable for coating, which is usually preferably from 15 to 60 seconds, and more preferably 20 to 40 seconds, as measured with a Ford Cup No. 4 viscometer at 20° C.

The wet coating film obtained by applying the paint of the present invention to a substance can be cured by heating. Heating can be performed by known heating means. For example, a drying furnace, such as a hot air furnace, an electric furnace, or an infrared induction heating furnace, can be used. The heating temperature is not particularly limited, and is, for example, within the range of 60 to 160° C., and preferably 80 to 140° C. The heating time is not particularly limited, and is, for example, within the range of 10 to 60 minutes, and preferably 15 to 30 minutes.

The paint of the present invention, which is a paint composition capable of forming a coating film that has both excellent water blushing resistance and finished appearance, can be suitably used, in particular, as top clear coat paint. The paint of the present invention can be suitably used as paint for, in particular, automobiles.

Method for Forming Multilayer Coating Film

The method for forming a multilayer coating film in which the paint of the present invention is applied as top clear coat paint may be a method for forming a multilayer coating film comprising sequentially forming on a substrate at least one layer of colored base coat paint and at least one layer of clear coat paint, wherein the paint composition of the present invention is applied as the clear coat paint for forming the uppermost layer.

Specific examples of such a method include a method for forming a multilayer coating film by a 2-coat 1-bake method, in which colored base coat paint is applied to a substrate onto which an electrodeposition coating film and/or intermediate coating film has been applied, the resulting uncured coating film is, as necessary, preheated at, for example, 40 to 90° C. for about 3 to 30 minutes to accelerate the vaporization of the solvent in the colored base coat paint, and the paint of the present invention is then applied as clear coat paint to the uncured colored base coating film, followed by simultaneous curing of the colored base coating film and the clear coating film.

The paint of the present invention can also be suitably used as top clear coat paint for top coating in a 3-coat 2-bake method or a 3-coat 1-bake method.

The base coat paint used in the above manner may be a commonly known thermosetting base coat paint. Specific examples include paints obtained by appropriately combining a crosslinking agent, such as an amino resin, a polyisocyanate compound, or a blocked polyisocyanate compound, with reactive functional groups of a base resin, such as an acrylic resin, a polyester resin, an alkyd resin, or a urethane resin.

As the base coat paint, for example, aqueous paint, organic solvent-based paint, or powder paint can also be used. From the viewpoint of the finished appearance of the coating film and a reduction in the environmental load, aqueous paint is preferable.

When two or more clear coating films are formed in the method for forming a multilayer coating film, the paint of the present invention or known thermosetting clear coat paint may be used as clear coat paint for forming a layer other than the uppermost layer.

EXAMPLES

The present invention is described below in more detail with reference to Production Examples, Examples, and Comparative Examples. However, the present invention is not limited to these. In each example, parts and percentages are expressed on a mass basis unless otherwise specified, and the film thickness is the thickness of a cured coating film.

Production of Hydroxy-Containing Acrylic Resin (A1-1-1)

Production Example 1

27 parts of Swasol 1000 (trade name, produced by Cosmo Oil Co., Ltd., an aromatic organic solvent) and 5 parts of propylene glycol monomethyl ether acetate were placed in a reaction vessel equipped with a thermometer, a thermostat, a stirrer, a reflux condenser, a nitrogen inlet tube, and a dropping funnel. While blowing nitrogen gas into the reaction vessel, the mixture was stirred at 150° C. A monomer mixture comprising 20 parts of styrene, 32.5 parts of 2-hydroxypropyl acrylate, 46.5 parts of isobutyl methacrylate, 1.0 part of acrylic acid, and 1.5 parts of ditertiary amyl peroxide (polymerization initiator) was added thereto dropwise at a constant rate over a period of 4 hours. The resulting mixture was then aged at 150° C. for 1 hour, cooled, and further diluted with the addition of 34 parts of butyl acetate, thereby obtaining a hydroxy-containing acrylic resin (A1-1-1) solution having a solids concentration of 60 mass %. The obtained hydroxy-containing acrylic resin (A1-1-1) had a hydroxy value of 140 mg KOH/g, an acid value of 8.0 mg KOH/g, a weight average molecular weight of 10000, and a glass transition temperature of 39° C.

Production of Hydroxy-Containing Acrylic Resin (A1-1-2)

Production Example 2

30 parts of Swasol 1000 (trade name, produced by Cosmo Oil Co., Ltd., an aromatic organic solvent) and 10 parts of n-butanol were placed in a reaction vessel equipped with a thermometer, a thermostat, a stirrer, a reflux condenser, a nitrogen inlet tube, and a dropping funnel. While blowing nitrogen gas into the reaction vessel, the mixture was stirred at 125° C. A monomer mixture comprising 30 parts of γ-methacryloxypropyltrimethoxysilane, 32.5 parts of 2-hydroxypropyl acrylate, 20 parts of styrene, 17.5 parts of isobutyl methacrylate, and 7.0 parts of 2,2'-azobis(2-methylbutyronitrile) (polymerization initiator) was added thereto dropwise at a constant rate over a period of 4 hours. The resulting mixture was then aged at 125° C. for 30 minutes, and a solution containing 0.5 parts of 2,2'-azobis(2-methylbutyronitrile) and 5.0 parts of Swasol 1000 (trade name, produced by Cosmo Oil Co., Ltd., an aromatic organic solvent) was added thereto dropwise at a constant rate over 1 hour. The resulting mixture was then aged at 125° C. for 1 hour, cooled, and further diluted with the addition of 8 parts of isobutyl acetate, thereby obtaining a hydroxy-containing acrylic resin (A1-1-2) solution (secondary-hydroxy- and alkoxysilyl-containing acrylic resin solution) having a solids concentration of 65 mass %. The obtained hydroxy-containing acrylic resin (A1-1-2) had an alkoxysilyl group content of 1.21 mmol/g, a hydroxy value of 140 mg KOH/g, a weight average molecular weight of 7000, and a glass transition temperature of 18° C.

Production of Hydroxy-Containing Acrylic Resin (A1-1-3)

Production Example 3

30 parts of Swasol 1000 (trade name, produced by Cosmo Oil Co., Ltd., an aromatic organic solvent) and 10 parts of n-butanol were placed in a reaction vessel equipped with a thermometer, a thermostat, a stirrer, a reflux condenser, a nitrogen inlet tube, and a dropping funnel. While blowing nitrogen gas into the reaction vessel, the mixture was stirred at 125° C. A monomer mixture comprising 30 parts of γ-methacryloxypropyltrimethoxysilane, 32.5 parts of 2-hydroxyethyl methacrylate, 20 parts of styrene, 17.5 parts of isobutyl methacrylate, and 7.0 parts of 2,2'-azobis(2-methylbutyronitrile) (polymerization initiator) was added thereto dropwise at a constant rate over a period of 4 hours. The resulting mixture was then aged at 125° C. for 30 minutes, and a solution containing 0.5 parts of 2,2'-azobis(2-methylbutyronitrile) and 5.0 parts of Swasol 1000 (trade name, produced by Cosmo Oil Co., Ltd., an aromatic organic solvent) was added thereto dropwise at a constant rate over 1 hour. The resulting mixture was then aged at 125° C. for 1 hour, cooled, and further diluted with the addition of 8 parts of isobutyl acetate, whereby obtaining a hydroxy-containing acrylic resin (A1-1-3) solution (primary-hydroxy- and alkoxysilyl-containing acrylic resin solution) having a solids concentration of 65 mass %. The obtained hydroxy-containing acrylic resin (A1-1-3) had an alkoxysilyl group content of 1.21 mmol/g, a hydroxy value of 140 mg KOH/g, a weight average molecular weight of 7000, and a glass transition temperature of 39° C.

Production of First Rheology Control Agent (B)

Production Example 4

37 parts of heptane and 70 parts of Swasol 1000 (trade name, produced by Cosmo Oil Co., Ltd., an aromatic organic solvent) were placed in a four-necked flask equipped with a stirrer, thermometer, condenser tube, and a nitrogen gas inlet, and heated to 100° C. while blowing nitrogen. Subsequently, a mixture of 49.6 parts of the following copolymer dispersion stabilizer (b1-1-1) solution (note 1), 10.5 parts of the following another dispersion stabilizer (b1-2-1) solution (note 2), 65.0 parts of the following core monomer composition (note 3), 0.9 parts of 2,2'-azobisisobutyronitrile, and 20 parts of Swasol 1000 was added dropwise over 3 hours, and the resulting mixture was aged for another 2 hours, thereby obtaining a non-aqueous dispersion resin (b-1) solution. The obtained non-aqueous dispersion resin (b-1) solution had a solids content of 40% and an average particle size of 146 nm. The ratio of the copolymer dispersion stabilizer (b1-1-1)/another dispersion stabilizer (b1-2-1) was 85/15, and the core/shell ratio was 65/35.

Note 1: Copolymer dispersion stabilizer (b1-1-1) solution 12 parts of Swasol 1000 (trade name, produced by Cosmo Oil Co., Ltd., an aromatic organic solvent) was placed in a four-necked flask equipped with a stirrer, a thermometer, a water separator, and a nitrogen gas inlet, and heated to 125° C. Subsequently, a mixture of 8.8 parts of isobutyl methacrylate, 8.8 parts of 2-ethylhexyl acrylate, 8.8 parts of glycidyl methacrylate, 2.9 parts of 2-hydroxyethyl acrylate, 1.5 parts of t-butyl peroxy-2-ethyl hexanoate, and 4 parts of n-butanol was added dropwise over 4 hours, and the resulting mixture was aged for another 1 hour. Thereafter, a mixture of 0.15 parts of t-butyl peroxy-2-ethyl hexanoate and 3 parts of Swasol 1000 was added dropwise over 1 hour, and the mixture was aged for another 2 hours. Then, 0.02 parts of p-t-butylcatechol and 0.27 parts of acrylic acid were added to the flask, and the reaction was continued for about 4 hours until the resin acid value was 1.0 or less, thereby obtaining a copolymer dispersion stabilizer (b1-1-1) solution with a solids content of 60%.

Note 2: Another dispersion stabilizer (b1-2-1) solution

In a four-necked flask equipped with a stirrer, a thermometer, a cooling pipe, and a nitrogen gas inlet, 12-hydroxystearic acid was subjected to dehydration condensation under toluene reflux using methanesulfonic acid as a catalyst. The condensation was continued until the resin acid value was 30. Glycidyl methacrylate was added to the terminal carboxy group of the obtained self-condensed polyester having a number average molecular weight of about 1800 using dimethylaminoethanol as a catalyst to introduce polymerizable unsaturated groups, thereby obtaining a polymerizable-unsaturated-group-containing macromonomer solution having a solids content of 70%. The resulting polymerizable-unsaturated-group-containing macromonomer had about 1 polymerizable unsaturated group per molecule, based on the number average molecular weight. Subsequently, 2.7 parts of butyl acetate was added to the flask, and heated under reflux. A mixture of 3.7 parts of the above 70% polymerizable-unsaturated-group-containing macromonomer solution, 2.4 parts of methyl methacrylate, 0.2 parts of glycidyl methacrylate, 2.5 parts of xylene, and 0.15 parts of 2,2'-azobisisobutyronitrile was added dropwise at a constant rate over 3 hours, and the mixture was aged for another 2 hours. Then, a mixture of 0.01 parts of p-t-butylcatechol, 0.05 parts of methacrylic acid, and 0.01 parts of dimethylaminoethanol was added to the flask, and the reaction was continued at 140° C. for about 5 hours until the resin acid value was 0.5, thereby obtaining an another dispersion stabilizer (b1-2-1) solution having a solids content of 50%. The obtained another dispersion stabilizer (b1-2-1) was a graft polymer having a segment of 12-hydroxystearic acid, and a segment of a copolymer of methyl methacrylate and glycidyl methacrylate, and had about 4 polymerizable unsaturated groups per molecule on average.

Note 3: Core monomer composition

A mixture of 6.5 parts of styrene, 15.6 parts of methyl methacrylate, 6.5 parts of methyl acrylate, 32.5 parts of 2-hydroxyethyl acrylate, 2.6 parts of glycidyl methacrylate, and 1.3 parts of methacrylic acid.

Production Examples 5 to 6

Non-aqueous dispersion resin (b-2) to (b-3) solutions were obtained in the same manner as in Production Example 4, except that the formulations shown in Table 1 were used. The amounts of the components shown in Table 1 are expressed as solids content by mass.

TABLE 1

| | | | Production Example | | |
|---|---|---|---|---|---|
| | | | 4 | 5 | 6 |
| Non-aqueous dispersion resin name | | | b-1 | b-2 | b-3 |
| Shell portion | Copolymer dispersion stabilizer (b1-1) | Isobutyl methacrylate | 8.8 | 7.3 | 5.1 |
| | | 2-Ethylhexyl acrylate | 8.8 | 7.3 | 5.1 |
| | | Glycidyl methacrylate | 8.8 | 7.3 | 5.1 |
| | | 2-Hydroxyethyl acrylate | 2.9 | 2.4 | 1.7 |
| | | Acrylic acid | 0.27 | 0.22 | 0.15 |
| | Another dispersion stabilizer (b1-2) | Macromonomer | 2.6 | 5.1 | 1.5 |
| | | Methyl methacrylate | 2.4 | 4.8 | 1.4 |
| | | Glycidyl methacrylate | 0.2 | 0.5 | 0.1 |
| | | Methacrylic acid | 0.05 | 0.09 | 0.03 |

TABLE 1-continued

|  |  |  | Production Example | | |
|---|---|---|---|---|---|
|  |  |  | 4 | 5 | 6 |
| Core portion | Core monomer | Styrene | 6.5 | 6.5 | 8.0 |
|  |  | Methyl methacrylate | 15.6 | 15.6 | 19.2 |
|  |  | Methyl acrylate | 6.5 | 6.5 | 8.0 |
|  |  | 2-Hydroxyethyl acrylate | 32.5 | 32.5 | 40.0 |
|  |  | Glycidyl methacrylate | 2.6 | 2.6 | 3.2 |
|  |  | Methacrylic acid | 1.3 | 1.3 | 1.6 |
| Solids content (%) |  |  | 40 | 40 | 40 |
| Average particle size (nm) |  |  | 146 | 110 | 190 |
| Copolymer dispersion stabilizer (b1-1)/ another dispersion stabilizer (b1-2) ratio |  |  | 85/15 | 70/30 | 85/15 |
| Core/shell ratio |  |  | 65/35 | 65/35 | 80/20 |

Production of Second Rheology Control Agent (C)

Production Example 7

158.3 parts (solids content: 95.0 parts) of the hydroxy-containing acrylic resin (A1-1-1) solution obtained in Production Example 1, 15.2 parts of Swasol 1000 (trade name, produced by Cosmo Oil Co., Ltd., an aromatic organic solvent), and 10 parts of n-butanol were placed in a reaction vessel equipped with a stirrer and a dropping funnel. Then, an amine mixture comprising 2.44 parts of benzylamine and 0.6 parts of JEFFAMINE D-2000 (trade name, produced by Huntsman Corporation, a polyoxypropylene-containing diamine, number average molecular weight: 2000) was added thereto with stirring at room temperature. Subsequently, a mixture of 1.96 parts of hexamethylene diisocyanate and 11.5 parts of Swasol 1000 (trade name, produced by Cosmo Oil Co., Ltd., an aromatic organic solvent) was added dropwise with stirring to thereby obtain a second rheology control agent dispersion (CM-1). The obtained second rheology control agent dispersion (CM-1) had a solids content of 50%. in the obtained second rheology control agent dispersion (CM-1), the total mass of the components (c1) to (c3) was 5.0 parts by mass, the mass of the hydroxy-containing acrylic resin (A1-1-1), which is a resin component, was 95.0 parts by mass, and the ratio of (the total mass of the components (c1) to (c3))/(the mass of the resin component) was 5/95.

Production Examples 8 to 21

Second rheology control agent dispersions (CM-2) to (CM-15) were obtained in the same manner as in Production Example 7, except that the formulations shown in Table 2 were used. The obtained second rheology control agent dispersions (CM-2) to (CM-15) had a solids content of 50%. The amounts of the components shown in Table 2 are expressed as solids content by mass.

TABLE 2

|  |  |  |  |  | Production Example | | | | |
|---|---|---|---|---|---|---|---|---|---|
|  |  |  |  |  | 7 | 8 | 9 | 10 | 11 |
|  |  |  |  |  | Second rheology control agent dispersion name | | | | |
|  |  |  |  |  | CM-1 | CM-2 | CM-3 | CM-4 | CM-5 |
| Resin component | Hydroxy-containing resin (A1) |  | Hydroxy-containing acrylic resin (A1-1) | Hydroxy-containing acrylic resin (A1-1-1) | 95 | 95 | 95 | 95 | 95 |
| Second rheology control agent (C) | Amine mixture | Primary monoamine having a number average molecular weight of 300 or less (c2) | Benzylamine |  | 2.44 | 2.19 | 2.44 | 2.19 |  |
|  |  |  | Octylamine |  |  |  |  |  | 2.35 |
|  |  | Polyether amine having two or more amino groups and having a number average molecular weight of 1000 or more and less than 6000 (c3) | Polyoxyalkylene chain-containing diamine | JEFFAMINE D-2000 | 0.6 | 1.0 |  |  |  |
|  |  |  | Polyoxyalkylene chain-containing triamine | JEFFAMINE T-3000 (Note 4) |  |  | 0.6 | 1.0 | 1.0 |
|  |  | Polyisocyanate compound (c1) | Aliphatic polyisocyanate compound | Hexamethylene diisocyanate | 1.96 | 1.81 | 1.96 | 1.81 | 1.65 |
|  | Proportion of each component based on the total mass of components (c1) to (c3) (mass %) |  | Polyisocyanate compound (c1) |  | 39.3 | 36.1 | 39.3 | 36.1 | 33.1 |
|  |  |  | Primary monoamine having a number average molecular weight of 300 or less (c2) |  | 48.7 | 43.9 | 48.7 | 43.9 | 46.9 |

TABLE 2-continued

| | | | | | | | | | |
|---|---|---|---|---|---|---|---|---|---|
| | | | Polyether amine having two or more amino groups and having a number average molecular weight of 1000 or more and less than 6000 (c3) | | 12 | 20 | 12 | 20 | 20 |
| Total mass of components (c1) to (c3) | | | | | 5.0 | 5.0 | 5.0 | 5.0 | 5.0 |
| Mass of resin component | | | | | 95.0 | 95.0 | 95.0 | 95.0 | 95.0 |
| (Total mass of components (c1) to (c3))/(mass of resin component) ratio | | | | | 5/95 | 5/95 | 5/95 | 5/95 | 5/95 |

| | | | | | Production Example | | | |
|---|---|---|---|---|---|---|---|---|
| | | | | | 12 | 13 | 14 | 15 |
| | | | | | Second rheology control agent dispersion name | | | |
| | | | | | CM-6 | CM-7 | CM-8 | CM-9 |
| Resin component | Hydroxy-containing resin (A1) | | Hydroxy-containing acrylic resin (A1-1) | Hydroxy-containing acrylic resin (A1-1-1) | 97.5 | 95 | 95 | 95 |
| Second rheology control agent (C) | Amine mixture | Primary monoamine having a number average molecular weight of 300 or less (c2) | Benzylamine | | | 1.1 | 1.95 | 2.19 | 2.21 |
| | | Polyether amine having two or more amino groups and having a number average molecular weight of 1000 or more and less than 6000 (c3) | Polyoxyalkylene chain-containing diamine | JEFFAMINE D-2000 | | | | 0.50 | |
| | | | Polyoxyalkylene chain-containing triamine | JEFFAMINE T-3000 (Note 4) | 0.5 | 1.4 | 0.50 | |
| | | | | JEFFAMINE T-5000 (Note 5) | | | | 1.0 |
| | Polyisocyanate compound (c1) | | Aliphatic polyisocyanate compound | Hexamethylene diisocyanate | 0.9 | 1.65 | 1.81 | 1.79 |
| Proportion of each component based on the total mass of components (c1) to (c3) (mass %) | | | Polyisocyanate compound (c1) | | 36.0 | 33.0 | 36.1 | 35.7 |
| | | | Primary monoamine having a number average molecular weight of 300 or less (c2) | | 44.0 | 39.0 | 43.9 | 44.3 |
| | | | Polyether amine having two or more amino groups and having a number average molecular weight of 1000 or more and less than 6000 (c3) | | 20 | 28 | 20 | 20 |
| Total mass of components (c1) to (c3) | | | | | 2.5 | 5.0 | 5.0 | 5.0 |
| Mass of resin component | | | | | 97.5 | 95.0 | 95.0 | 95.0 |
| (Total mass of components (c1) to (c3))/(mass of resin component) ratio | | | | | 2.5/97.5 | 5/95 | 5/95 | 5/95 |

| | | | | | Production Example | | | |
|---|---|---|---|---|---|---|---|---|
| | | | | | 16 | 17 | 18 | 19 |
| | | | | | Second rheology control agent dispersion name | | | |
| | | | | | CM-10 | CM-11 | CM-12 | CM-13 |
| Resin component | Hydroxy-containing resin (A1) | | Hydroxy-containing acrylic resin (A1-1) | Hydroxy-containing acrylic resin (A1-1-1) | 95 | 95 | 95 | 95 |
| Second rheology control agent (C) | Amine mixture | Primary monoamine having a number average molecular weight of 300 or less (c2) | Benzylamine | | 2.68 | 2.56 | 2.68 | 2.44 |
| | | Polyether amine having two or more amino groups and having a number average molecular weight of 1000 or more and less than 6000 (c3) | Polyoxyalkylene chain-containing diamine | JEFFAMINE D-2000 | 0.2 | 0.4 | | |
| | | | Polyoxyalkylene chain-containing triamine | JEFFAMINE T-3000 (Note 4) | | | 0.2 | |
| | | Polyether amine other than (c3) | Polyoxyalkylene chain-containing monoamine | JEFFAMINE M-1000 (Note 6) | | | | 0.6 |

TABLE 2-continued

| | | | | | | | |
|---|---|---|---|---|---|---|---|
| Polyisocyanate compound (c1) | | Aliphatic polyisocyanate compound | Hexamethylene diisocyanate | 2.12 | 2.04 | 2.12 | 1.96 |
| Proportion of each component based on the total mass of components (c1) to (c3) (mass %) | | | Polyisocyanate compound (c1) | 42.4 | 40.8 | 42.4 | 44.5 |
| | | | Primary monoamine having a number average molecular weight of 300 or less (c2) | 53.6 | 51.2 | 53.6 | 55.5 |
| | | | Polyether amine having two or more amino groups and having a number average molecular weight of 1000 or more and less than 6000 (c3) | 4 | 8 | 4 | 0 |
| Total mass of components (c1) to (c3) and polyether amine other than (c3) | | | | 5.0 | 5.0 | 5.0 | 5.0 |
| Mass of resin component | | | | 95.0 | 95.0 | 95.0 | 95.0 |
| (Total mass of components (c1) to (c3) and polyether amine other than (c3))/(mass of resin component) ratio | | | | 5/95 | 5/95 | 5/95 | 5/95 |

| | | | | | Production Example | |
|---|---|---|---|---|---|---|
| | | | | | 20 | 21 |
| | | | | | Second rheology control agent dispersion name | |
| | | | | | CM-14 | CM-15 |
| Resin component | Hydroxy-containing resin (A1) | | Hydroxy-containing acrylic resin (A1-1) | Hydroxy-containing acrylic resin (A1-1-1) | 95 | 95 |
| Second rheology control agent (C) | Amine mixture | Primary monoamine having a number average molecular weight of 300 or less (c2) | Benzylamine | | 2.25 | 2.32 |
| | | Polyether amine having two or more amino groups and having a number average molecular weight of 1000 or more and less than 6000 (c3) | Polyoxyalkylene chain-containing diamine | JEFFAMINE D-2000 | | |
| | | | Polyoxyalkylene chain-containing triamine | JEFFAMINE T-3000 (Note 4) | | |
| | | Polyether amine other than (c3) | Polyoxyalkylene chain-containing triamine | JEFFAMINE T-403 (Note 7) | 0.6 | |
| | | | Polyoxyalkylene chain-containing diamine | JEFFAMINE D-400 (Note 8) | | 0.6 |
| | Polyisocyanate compound (c1) | | Aliphatic polyisocyanate compound | Hexamethylene diisocyanate | 2.15 | 2.08 |
| Proportion of each component based on the total mass of components (c1) to (c3) (mass %) | | | Polyisocyanate compound (c1) | | 48.9 | 47.3 |
| | | | Primary monoamine having a number average molecular weight of 300 or less (c2) | | 51.1 | 52.7 |
| | | | Polyether amine having two or more amino groups and having a number average molecular weight of 1000 or more and less than 6000 (c3) | | 0 | 0 |
| Total mass of components (c1) to (c3) and polyether amine other than (c3) | | | | | 5.0 | 5.0 |
| Mass of resin component | | | | | 95.0 | 95.0 |
| (Total mass of components (c1) to (c3) and polyether amine other than (c3))/(mass of resin component) ratio | | | | | 5/95 | 5/95 |

The notes in Table 2 mean the following.

Note 4: JEFFAMINE T-3000: trade name, produced by Huntsman Corporation, polyoxyalkylene-containing triamine, a number average molecular weight of 3000

Note 5: JEFFAMINE T-5000: trade name, produced by Huntsman Corporation, polyoxyalkylene-containing triamine, a number average molecular weight of 5000

Note 6: JEFFAMINE M-1000: trade name, produced by Huntsman Corporation, polyoxyalkylene-containing monoamine, a number average molecular weight of 1000

Note 7: JEFFAMINE T-403: trade name, produced by Huntsman Corporation, polyoxyalkylene-containing triamine, a number average molecular weight of 440

Note 8: JEFFAMINE D-400: trade name, produced by Huntsman Corporation, polyoxyalkylene-containing diamine, a number average molecular weight of 400

Production of Paint Composition: Part 1

Example 1

82.3 parts (solids content: 49.4 parts) of the hydroxy-containing acrylic resin (A1-1-1) solution obtained in Production Example 1, 6.7 parts (solids content: 4 parts) of U-VAN 20SE60 (trade name, produced by Mitsui Chemicals, Inc., a melamine resin, solids content: 60%), 10 parts (solids content: 4 parts) of the non-aqueous dispersion resin (b-1) solution obtained in Production Example 4, 16 parts (solids content: 8 parts, in which the second rheology control agent (C) component makes up 0.4 parts, and the hydroxy-containing acrylic resin (A1-1-1) makes up 7.6 parts) of the second rheology control agent dispersion (CM-1) solution obtained in Production Example 7, 0.4 parts (solids content: 0.2 parts) of BYK-300 (trade name, produced by BYK-Chemie, a surface-adjusting agent, active ingredient: 52%), and 0.3 parts (solids content: 0.1 parts) of NACURE 5523 (trade name, amine salt of dodecylbenzenesulfonic acid, catalyst, active ingredient: 35%, produced by King Industries, Inc.) were uniformly mixed to obtain a main agent.

The main agent and 35 parts of Sumidur N3300 (trade name, produced by Sumika Covestro Urethane Co., Ltd., an isocyanurate of hexamethylene diisocyanate, solids content: 100%), which is a curing agent (crosslinking agent (A2)), were uniformly mixed immediately before application; and butyl acetate was further added thereto to adjust the viscosity to 30 seconds as measured with a Ford Cup No. 4 at 20° C., thereby obtaining paint composition No. 1.

Examples 2 to 21 and Comparative Examples 1 to 8

Paint compositions No. 2 to 29 with a viscosity of 30 seconds as measured with a Ford Cup No. 4 at 20° C. were obtained in the same manner as in Example 1, except that the formulations shown in Table 3 below were used. The amounts of the components shown in Table 3 are expressed as solids content by mass.

Preparation of Test Panel: Part 1

Preparation of Test Panel for Examples 1 to 21 and Comparative Examples 1 to 8

Preparation of Test Panel for Evaluation of Finished Appearance and Water Blushing Resistance Elecron GT-10 (trade name, produced by Kansai Paint Co., Ltd., cationic electrodeposition paint) was applied by electrodeposition to a cold-rolled steel plate (10 cm×15 cm) treated with zinc phosphate to a dry film thickness of 20 μm, and cured by heating at 170° C. for 30 minutes. Thereafter, WP-306T (trade name, produced by Kansai Paint Co., Ltd., polyester melamine resin-based aqueous intermediate paint) was electrostatically applied to the electrodeposition coating film by using a rotary atomization electrostatic coating machine to a cured film thickness of 30 μm and allowed to stand for 5 minutes, followed by preheating at 80° C. for 3 minutes and then heating at 140° C. for 30 minutes, thereby preparing a test substrate. Subsequently, WBC-713T No. 202 (trade name, produced by Kansai Paint Co., Ltd., acrylic melamine resin-based aqueous base coat paint, coating color: black) was electrostatically applied to the test substrate held upright by using a rotary atomization electrostatic coating machine to a cured film thickness of 15 μm. The resulting test substrate was allowed to stand for 5 minutes, and then preheated in an upright state at 80° C. for 3 minutes. Subsequently, paint composition No. 1 was electrostatically applied to the uncured base coating film in an upright state by using a rotary atomization electrostatic coating machine to a dry film thickness of 45 μm to form a clear coating film. The resulting product was allowed to stand for 7 minutes and heated at 140° C. for 30 minutes (keeping time) in an upright state to cure the base coating film and the clear coating film, thereby preparing a test panel of Example 1.

Test panels of paint compositions No. 2 to 29 were prepared in the same manner as in the preparation of test panel of paint composition No. 1, except that paint compositions No. 2 to 29 were each used.

Preparation of Test Panel for Evaluation of Sag Resistance

Elecron GT-10 (trade name, produced by Kansai Paint Co., Ltd., cationic electrodeposition paint) was applied by electrodeposition to a cold-rolled steel plate (11 cm×45 cm) treated with zinc phosphate to a dry film thickness of 20 μm, and cured by heating at 170° C. for 30 minutes. Thereafter, WP-306T (trade name, produced by Kansai Paint Co., Ltd., polyester melamine resin-based aqueous intermediate paint) was electrostatically applied to the electrodeposition coating film by using a rotary atomization electrostatic coating machine to a cured film thickness of 30 μm and allowed to stand for 5 minutes, followed by preheating at 80° C. for 3 minutes and then heating at 140° C. for 30 minutes, thereby preparing a test substrate. Subsequently, 21 punch holes with a diameter of 5 mm were formed in a row at 2-cm intervals at a distance 3 cm away from the edge on a longitudinal side of the test substrate. Subsequently, WBC-713T No. 202 (trade name, produced by Kansai Paint Co., Ltd., acrylic melamine resin-based aqueous base coat paint, coating color: black) was electrostatically applied to the test substrate held upright by using a rotary atomization electrostatic coating machine to a cured film thickness of 15 μm. The resulting test substrate was allowed to stand for 5 minutes, and preheated in an upright state at 80° C. for 3 minutes. Thereafter, paint composition No. 1 was applied to the uncured coating film in an upright state by using a rotary atomization electrostatic coating machine to a film thickness of approximately 30 μm to 60 μm with a gradient in the longitudinal direction. The resulting product was allowed to stand for 7 minutes at room temperature and heated at 140° C. for 30 minutes (keeping time) in an upright state to cure the base coating film and the clear coating film, thereby preparing a test panel of Example 1.

Test panels of paint compositions No. 2 to 29 were prepared in the same manner as in the preparation of test panel of paint composition No. 1, except that paint compositions No. 2 to 29 were each used.

The test panels obtained above were each evaluated by the test methods described below. Table 3 shows the evaluation results together with the formulations of the paint compositions.

Test Method

Finished appearance: The finished appearance of each test panel was evaluated based on a long wave (LW) value measured by using Wave Scan (trade name, produced by BYK Gardner). The smaller the LW value, the higher the smoothness of the coating surface.

Water blushing resistance: The water blushing resistance of each test panel was evaluated based on a difference in L* values measured with a CM-512m3 (trade name, produced by Konica Minolta, Inc., a multi-angle spectrophotometer) before and after immersion in hot water. In this test, the L* value was a value obtained by summing the L* values obtained when the panel was illuminated with standard illuminant D65 from three angles, i.e., 25° (highlight direction), 45°, and 75° (bottom direction), relative to the receiving angle (the direction perpendicular to the coated surface was regarded as 0°). After the L* values were measured, the test panel was immersed in hot water at 40° C. for 10 days, the L* values of the test panel after immersion were measured, and the difference ΔL* between the L* values before and after immersion was calculated. A smaller ΔL* value indicates less blushing of the coating due to hot-water immersion, and represents higher water blushing resistance.

Sag resistance: Each test panel was examined to determine the portions where 3 mm sagging of the coating composition was observed from the lower end of each punch hole. The sag resistance was evaluated by measuring the film thickness (sagging-limit film thickness (μm)) at these portions. The larger the sagging-limit film thickness, the better the sag resistance.

TABLE 3

|  |  |  |  |  | Example 1 | 2 | 3 | 4 | 5 | 6 | 7 |
|---|---|---|---|---|---|---|---|---|---|---|---|
|  |  |  |  |  | Paint composition No. |  |  |  |  |  |  |
|  |  |  |  |  | 1 | 2 | 3 | 4 | 5 | 6 | 7 |
| Main agent | Binder component (A) | Hydroxy-containing resin (A1) | Hydroxy-containing acrylic resin (A1-1) | Hydroxy-containing acrylic resin (A1-1-1) | 49.4 | 49.4 | 49.4 | 49.4 | 49.4 | 49.2 | 41.4 |
|  |  | Crosslinking agent (A2) | Amino resin | U-VAN 20SE60 | 4 | 4 | 4 | 4 | 4 | 4 | 4 |
|  | Non-aqueous dispersion resin |  |  | Name | b-1 | b-1 | b-1 | b-1 | b-1 | b-1 | b-1 |
|  |  |  |  | Amount | 4 | 4 | 4 | 4 | 4 | 4 | 4 |
|  | Second rheology control agent dispersion |  |  | Name | CM-1 | CM-2 | CM-3 | CM-4 | CM-5 | CM-6 | CM-6 |
|  |  |  |  | Amount | 8 | 8 | 8 | 8 | 8 | 8 | 16 |
|  | Surface-adjusting agent |  |  | BYK-300 | 0.2 | 0.2 | 0.2 | 0.2 | 0.2 | 0.2 | 0.2 |
|  | Catalyst |  |  | NACURE 5523 | 0.1 | 0.1 | 0.1 | 0.1 | 0.1 | 0.1 | 0.1 |
| Curing agent | Binder component (A) | Crosslinking agent (A2) | Polyisocyanate compound | Sumidur N3300 | 35 | 35 | 35 | 35 | 35 | 35 | 35 |
| Content of components (A), (B), and (C) (parts by mass) | Binder component (A) | Hydroxy-containing resin (A1) |  |  | 57 | 57 | 57 | 57 | 57 | 57 | 57 |
|  |  | Crosslinking agent (A2) |  |  | 39 | 39 | 39 | 39 | 39 | 39 | 39 |
|  | First rheology control agent (B) |  |  |  | 4 | 4 | 4 | 4 | 4 | 4 | 4 |
|  | Second rheology control agent (C) |  |  |  | 0.4 | 0.4 | 0.4 | 0.4 | 0.4 | 0.2 | 0.4 |
| Evaluation results | Finished appearance (LW) |  |  |  | 5.5 | 5.1 | 4.9 | 4.7 | 4.7 | 4.6 | 4.5 |
|  | Sag resistance (μm) |  |  |  | 52 | 53 | 53 | 55 | 54 | 54 | 55 |
|  | Water blushing resistance (ΔL*) |  |  |  | 0.1 | 0.0 | 0.0 | 0.0 | 0.0 | 0.0 | 0.0 |

|  |  |  |  |  | Example 8 | 9 | 10 | 11 | 12 |
|---|---|---|---|---|---|---|---|---|---|
|  |  |  |  |  | Paint composition No. |  |  |  |  |
|  |  |  |  |  | 8 | 9 | 10 | 11 | 12 |
| Main agent | Binder component (A) | Hydroxy-containing resin (A1) | Hydroxy-containing acrylic resin (A1-1) | Hydroxy-containing acrylic resin (A1-1-1) | 41.4 | 41.4 | 45.4 | 45.4 | 25.8 |
|  |  | Crosslinking agent (A2) | Amino resin | U-VAN 20SE60 | 4 | 4 |  | 35 | 4 |
|  | Non-aqueous dispersion resin |  |  | Name | b-2 | b-3 | b-1 | b-1 | b-1 |
|  |  |  |  | Amount | 4 | 4 | 4 | 4 | 4 |
|  | Second rheology control agent dispersion |  |  | Name | CM-6 | CM-6 | CM-6 | CM-6 | CM-6 |
|  |  |  |  | Amount | 16 | 16 | 16 | 16 | 32 |
|  | Surface-adjusting agent |  |  | BYK-300 | 0.2 | 0.2 | 0.2 | 0.2 | 0.2 |
|  | Catalyst |  |  | NACURE 5523 | 0.1 | 0.1 |  | 0.1 | 0.1 |
| Curing agent | Binder component (A) | Crosslinking agent (A2) | Polyisocyanate compound | Sumidur N3300 | 35 | 35 | 35 |  | 35 |
| Content of components (A), (B), and (C) (parts by mass) | Binder component (A) | Hydroxy-containing resin (A1) |  |  | 57 | 57 | 61 | 61 | 57 |
|  |  | Crosslinking agent (A2) |  |  | 39 | 39 | 35 | 35 | 39 |
|  | First rheology control agent (B) |  |  |  | 4 | 4 | 4 | 4 | 4 |
|  | Second rheology control agent (C) |  |  |  | 0.4 | 0.4 | 0.4 | 0.4 | 0.8 |
| Evaluation results | Finished appearance (LW) |  |  |  | 4.6 | 4.5 | 4.7 | 4.9 | 5.3 |
|  | Sag resistance (μm) |  |  |  | 57 | 54 | 56 | 55 | 56 |
|  | Water blushing resistance (ΔL*) |  |  |  | 0.0 | 0.0 | 0.0 | 0.0 | 0.1 |

TABLE 3-continued

|  |  |  |  |  | Example |  |  |  |  |
|---|---|---|---|---|---|---|---|---|---|
|  |  |  |  |  | 13 | 14 | 15 | 16 | 17 |
|  |  |  |  |  | Paint composition No. | | | | |
|  |  |  |  |  | 13 | 14 | 15 | 16 | 17 |
| Main agent | Binder component (A) | Hydroxy-containing resin (A1) | Hydroxy-containing acrylic resin (A1-1) | Hydroxy-containing acrylic resin (A1-1-1) | 10.2 | 43.4 | 49.4 | 49.4 | 49.4 |
|  |  | Crosslinking agent (A2) | Amino resin | U-VAN 20SE60 | 4 | 4 | 4 | 4 | 4 |
|  | Non-aqueous dispersion resin |  |  | Name | b-1 | b-1 | b-1 | b-1 | b-1 |
|  |  |  |  | Amount | 4 | 2 | 4 | 4 | 4 |
|  | Second rheology control agent dispersion |  |  | Name | CM-6 | CM-6 | CM-7 | CM-8 | CM-9 |
|  |  |  |  | Amount | 48 | 16 | 8 | 8 | 8 |
|  | Surface-adjusting agent |  |  | BYK-300 | 0.2 | 0.2 | 0.2 | 0.2 | 0.2 |
|  | Catalyst |  |  | NACURE 5523 | 0.1 | 0.1 | 0.1 | 0.1 | 0.1 |
| Curing agent | Binder component (A) | Crosslinking agent (A2) | Polyisocyanate compound | Sumidur N3300 | 35 | 35 | 35 | 35 | 35 |
| Content of components (A), (B), and (C) (parts by mass) | Binder component (A) | Hydroxy-containing resin (A1) |  |  | 57 | 59 | 57 | 57 | 57 |
|  |  | Crosslinking agent (A2) |  |  | 39 | 39 | 39 | 39 | 39 |
|  | First rheology control agent (B) |  |  |  | 4 | 2 | 4 | 4 | 4 |
|  | Second rheology control agent (C) |  |  |  | 1.2 | 0.4 | 0.4 | 0.4 | 0.4 |
| Evaluation results | Finished appearance (LW) |  |  |  | 6.0 | 4.6 | 4.8 | 5.0 | 4.8 |
|  | Sag resistance (μm) |  |  |  | 57 | 53 | 56 | 55 | 53 |
|  | Water blushing resistance (ΔL*) |  |  |  | 0.3 | 0.0 | 0.0 | 0.1 | 0.0 |

|  |  |  |  |  | Example |  |  |  |
|---|---|---|---|---|---|---|---|---|
|  |  |  |  |  | 18 | 19 | 20 | 21 |
|  |  |  |  |  | Paint composition No. | | | |
|  |  |  |  |  | 18 | 19 | 20 | 21 |
| Main agent | Binder component (A) | Hydroxy-containing resin (A1) | Hydroxy-containing acrylic resin (A1-1) | Hydroxy-containing acrylic resin (A1-1-1) | 41.4 | 41.4 | 41.4 | 41.4 |
|  |  | Crosslinking agent (A2) | Amino resin | U-VAN 20SE60 | 4 | 4 | 4 | 4 |
|  | Non-aqueous dispersion resin |  |  | Name | b-1 | b-1 | b-1 | b-1 |
|  |  |  |  | Amount | 4 | 4 | 4 | 4 |
|  | Second rheology control agent dispersion |  |  | Name | CM-6 | CM-6 | CM-6 | CM-6 |
|  |  |  |  | Amount | 16 | 16 | 16 | 16 |
|  | Surface-adjusting agent |  |  | BYK-300 | 0.2 | 0.2 | 0.2 | 0.2 |
|  | Ultraviolet absorber |  |  | TINUVIN 400 (Note 9) | 3 | 3 | 3 | 3 |
|  | Light stabilizer |  |  | HOSTAVIN 3058 (Note 10) | 1 | 1 | 1 | 1 |
|  | Catalyst |  |  | NACURE 5523 | 0.1 |  |  |  |
|  |  |  |  | NACURE 4167 (Note 11) |  | 0.1 |  |  |
|  |  |  |  | NEOSTANN U-600 (Note 12) |  |  | 0.1 |  |
| Curing agent | Binder component (A) | Crosslinking agent (A2) | Polyisocyanate compound | Sumidur N3300 | 35 | 35 | 35 | 35 |
| Content of components (A), (B), and (C) (parts by mass) | Binder component (A) | Hydroxy-containing resin (A1) |  |  | 57 | 57 | 57 | 57 |
|  |  | Crosslinking agent (A2) |  |  | 39 | 39 | 39 | 39 |
|  | First rheology control agent (B) |  |  |  | 4 | 4 | 4 | 4 |
|  | Second rheology control agent (C) |  |  |  | 0.4 | 0.4 | 0.4 | 0.4 |
| Evaluation results | Finished appearance (LW) |  |  |  | 4.5 | 4.6 | 4.5 | 4.8 |
|  | Sag resistance |  |  |  | 55 | 55 | 54 | 54 |
|  | Water blushing resistance (ΔL*) |  |  |  | 0.0 | 0.0 | 0.0 | 0.0 |

|  |  |  |  |  | Comparative Example |  |  |  |
|---|---|---|---|---|---|---|---|---|
|  |  |  |  |  | 1 | 2 | 3 | 4 |
|  |  |  |  |  | Paint composition No. | | | |
|  |  |  |  |  | 22 | 23 | 24 | 25 |
| Main agent | Binder component (A) | Hydroxy-containing resin (A1) | Hydroxy-containing acrylic resin (A1-1) | Hydroxy-containing acrylic resin (A1-1-1) | 55 | 49.4 | 49.4 | 49.4 |

TABLE 3-continued

| | | | | | | | | |
|---|---|---|---|---|---|---|---|---|
| | | Crosslinking agent (A2) | Amino resin | U-VAN 20SE60 | 4 | 4 | 4 | 4 |
| | Non-aqueous dispersion resin | | Name | | b-1 | b-1 | b-1 | b-1 |
| | | | Amount | | 6 | 4 | 4 | 4 |
| | Second rheology control agent dispersion | | Name | | | CM-10 | CM-11 | CM-12 |
| | | | Amount | | | 8 | 8 | 8 |
| | Surface-adjusting agent | | BYK-300 | | 0.2 | 0.2 | 0.2 | 0.2 |
| | Catalyst | | NACURE 5523 | | 0.1 | 0.1 | 0.1 | 0.1 |
| Curing agent | Binder component (A) | Crosslinking agent (A2) | Polyisocyanate compound | Sumidur N3300 | 35 | 35 | 35 | 35 |
| Content of components (A), (B), and (C) (parts by mass) | Binder component (A) | Hydroxy-containing resin (A1) | | | 55 | 57 | 57 | 57 |
| | | Crosslinking agent (A2) | | | 39 | 39 | 39 | 39 |
| | First rheology control agent (B) | | | | 6 | 4 | 4 | 4 |
| | Second rheology control agent (C) | | | | 0 | 0.4 | 0.4 | 0.4 |
| Evaluation results | Finished appearance (LW) | | | | 10.5 (Sagging) | 10.6 (Sagging) | 10.4 (Sagging) | 12.5 (Sagging) |
| | Sag resistance (μm) | | | | 39 | 42 | 43 | 43 |
| | Water blushing resistance (ΔL*) | | | | 0.0 | 0.5 | 0.4 | 0.7 |

| | | | | | Comparative Example | | | |
|---|---|---|---|---|---|---|---|---|
| | | | | | 5 | 6 | 7 | 8 |
| | | | | | Paint composition No. | | | |
| | | | | | 26 | 27 | 28 | 29 |
| Main agent | Binder component (A) | Hydroxy-containing resin (A1) | Hydroxy-containing acrylic resin (A1-1) | Hydroxy-containing acrylic resin (A1-1-1) | 49.4 | 49.4 | 49.4 | 45.8 |
| | | Crosslinking agent (A2) | Amino resin | U-VAN 20SE60 | 4 | 4 | 4 | 4 |
| | Non-aqueous dispersion resin | | Name | | b-1 | b-1 | b-1 | |
| | | | Amount | | 4 | 4 | 4 | |
| | Second rheology control agent dispersion | | Name | | CM-13 | CM-14 | CM-15 | CM-15 |
| | | | Amount | | 8 | 8 | 8 | 16 |
| | Surface-adjusting agent | | BYK-300 | | 0.2 | 0.2 | 0.2 | 0.2 |
| | Catalyst | | NACURE 5523 | | 0.1 | 0.1 | 0.1 | 0.1 |
| Curing agent | Binder component (A) | Crosslinking agent (A2) | Polyisocyanate compound | Sumidur N3300 | 35 | 35 | 35 | 35 |
| Content of components (A), (B), and (C) (parts by mass) | Binder component (A) | Hydroxy-containing resin (A1) | | | 57 | 57 | 57 | 61 |
| | | Crosslinking agent (A2) | | | 39 | 39 | 39 | 39 |
| | First rheology control agent (B) | | | | 4 | 4 | 4 | 0 |
| | Second rheology control agent (C) | | | | 0.4 | 0.4 | 0.4 | 0.8 |
| Evaluation results | Finished appearance (LW) | | | | 10.8 (Sagging) | 11.8 (Sagging) | 11.8 (Sagging) | 10.3 (Sagging) |
| | Sag resistance (μm) | | | | 41 | 40 | 40 | 44 |
| | Water blushing resistance (ΔL*) | | | | 0.5 | 0.5 | 0.5 | 0.9 |

The notes in Table 3 mean the following.

Note 9: TINUVIN 400: trade name, benzotriazole ultraviolet absorber, active ingredient: 100%, produced by BASF Note 10: HOSTAVIN 3058: trade name, hindered amine light stabilizer, acylated hindered amine, active ingredient: 100%, produced by Clariant Note 11: NACURE 4167: trade name, triethylamine salt of alkylphosphoric acid, curing catalyst for melamine resin, active ingredient: 25%, produced by King Industries, Inc.

Note 12: NEOSTANN U-600: trade name, inorganic bismuth, active ingredient: 100%, produced by Nitto Kasei Co., Ltd.

Production of Paint Composition: Part 2

Example 22

32.3 parts (solids content: 19.4 parts) of the hydroxy-containing acrylic resin (A1-1-1) solution obtained in Production Example 1, 33.8 parts (solids content: 22 parts) of the hydroxy-containing acrylic resin (A1-1-2) solution obtained in Production Example 2, 6.7 parts (solids content: 4 parts) of U-VAN 20SE60 (trade name, produced by Mitsui Chemicals, Inc., a melamine resin, solids content: 60%), 10 parts (solids content: 4 parts) of the non-aqueous dispersion resin (b-1) solution obtained in Example 4, 32 parts (solids content: 16 parts, in which the second rheology control agent (C) component makes up 0.4 parts, and the hydroxy-containing acrylic resin (A1-1-1) makes up 15.6 parts) of the second rheology control agent dispersion (CM-6) solution obtained in Example 12, 0.4 parts (solids content: 0.2 parts) of BYK-300 (trade name, produced by BYK-Chemie, a surface-adjusting agent, active ingredient: 52%), and 0.3 parts (solids content: 0.1 parts) of NACURE 5523 (trade name, amine salt of dodecylbenzenesulfonic acid, catalyst, active ingredient: 35%, produced by King Industries, Inc.) were uniformly mixed to obtain a main agent. The main agent and 35 parts of Sumidur N3300 (trade name, produced by Sumika Covestro Urethane Co., Ltd., an isocyanurate of hexamethylene diisocyanate, solids content: 100%), which is a curing agent (crosslinking agent (A2)), were uniformly mixed immediately before application; and butyl acetate was further added thereto to adjust the viscosity to 30 seconds as measured with a Ford Cup No. 4 at 20° C., thereby obtaining paint composition No. 30.

Examples 23 to 24 and Comparative Example 9

Paint compositions No. 31 to 33 with a viscosity of 30 seconds as measured with a Ford Cup No. 4 at 20° C. were obtained in the same manner as in Example 22, except that the formulations shown in Table 4 below were used. The amounts of the components shown in Table 4 are expressed as solids content by mass.

Preparation of Test Panel: Part 2

Preparation of Test Panel for Examples 22 to 24 and Comparative Example 9

Preparation of Test Panel for Evaluation of Finished Appearance, Water Blushing Resistance, and Scratch Resistance Test panels of paint compositions No. 30 to 33 were prepared in the same manner as in the preparation of test panel for evaluation of finished appearance and water blushing resistance described in section "Preparation of test panel: Part 1," except that paint compositions No. 30 to 33 were each used.

Preparation of Test Panel for Evaluation of Sag Resistance

Test panels of paint compositions No. 30 to 33 were prepared in the same manner as in the preparation of test panel for evaluation of sag resistance in section "Preparation of test panel: Part 1," except that paint compositions No. 30 to 33 were each used.

The test panels obtained above were each evaluated by the test methods described below. Table 4 shows the evaluation results together with the formulations of the paint compositions.

Test Method 2

The finished appearance, the water blushing resistance, and the sag resistance were evaluated in the same manner as described above in "Test method 1."

Scratch resistance: Each test panel was attached to an automobile roof by using water-resistant adhesive tape (produced by Nichiban Co., Ltd.), and the automobile, which had the test panel on its roof, was washed 15 times in a car wash at 20° C. Thereafter, the 20° specular reflection (20° gloss) of the test panel was measured, and the gloss retention (%) relative to the 20° gloss value before the test was calculated to evaluate the scratch resistance. The higher the gloss retention, the better the scratch resistance. In this specification, an evaluation result of A, B, or C means excellent scratch resistance. The car wash used was a PO20 FWRC (produced by Yasui Sangyo K.K.).

A: Gloss retention of 80% or more
B: Gloss retention of 75% or more and less than 80%
C: Gloss retention of 70% or more and less than 75%
D: Gloss retention of 50% or more and less than 70%
E: Gloss retention of less than 50%

TABLE 4

| | | | | | Example | | | Comparative Example |
|---|---|---|---|---|---|---|---|---|
| | | | | | 22 | 23 | 24 | 9 |
| | | | | | \multicolumn{4}{c}{Paint composition No.} |
| | | | | | 30 | 31 | 32 | 33 |
| Main agent | Binder component (A) | Hydroxy-containing resin (A1) | Hydroxy-containing acrylic resin (A1-1) | Hydroxy-containing acrylic resin (A1-1-1) | 19.4 | 9.4 | 19.4 | 23.8 |
| | | | | Secondary-hydroxy- and alkoxysilyl-containing acrylic resin (A1-1-2) | 22 | 32 | | 22 |
| | | | | Primary-hydroxy- and alkoxysilyl-containing acrylic resin (A1-1-3) | | | 22 | |
| | | Crosslinking agent (A2) | Amino resin | U-VAN 20SE60 | 4 | 4 | 4 | 4 |
| | Non-aqueous dispersion resin | | | Name | b-1 | b-1 | b-1 | |
| | | | | Amount | 4 | 4 | 4 | |
| | Second rheology control agent dispersion | | | Name | CM-6 | CM-6 | CM-6 | CM-15 |
| | | | | Amount | 16 | 16 | 16 | 16 |
| | Surface-adjusting agent | | | BYK-300 | 0.2 | 0.2 | 0.2 | 0.2 |
| | Catalyst | | | NACURE 5523 | 0.1 | 0.1 | 0.1 | 0.1 |
| Curing agent | Binder component (A) | Crosslinking agent (A2) | Polyisocyanate compound | Sumidur N3300 | 35 | 35 | 35 | 35 |
| Content of components (A), (B), and (C) (parts by mass) | Binder component (A) | Hydroxy-containing acrylic resin (A1) | | | 35 | 25 | 35 | 39 |
| | | Secondary-hydroxy- and alkoxysilyl-containing acrylic resin (A1-1-2) | | | 22 | 32 | 22 | 22 |
| | | Crosslinking agent (A2) | | | 39 | 39 | 39 | 39 |
| | First rheology control agent (B) | | | | 4 | 4 | 4 | |
| | Second rheology control agent (C) | | | | 0.4 | 0.4 | 0.4 | 0.8 |
| Evaluation results | Finished appearance (LW) | | | | 4.7 | 5.5 | 4.9 | 10.6 (Sagging) |
| | Sag resistance | | | | 55 | 56 | 54 | 44 |
| | Water blushing resistance (ΔL*) | | | | 0.0 | 0.0 | 0.0 | 0.9 |
| | Scratch resistance. | | | | B | A | B | B |

The embodiments and Examples of the present invention are described in detail above. However, the present invention is not limited to these embodiments, and various modifications can be made based on the technical idea of the present invention.

For instance, the structures, methods, steps, shapes, materials, and values stated in the embodiments and Examples above are merely examples, and different structures, methods, steps, shapes, materials, values, and the like may also be used, as necessary.

Additionally, the structures, methods, steps, shapes, materials, values, and the like stated in the embodiments may be interchangeably combined without departing from the spirit and principal concepts of the present invention.

The present invention can also use the following structures.

[1] A paint composition comprising
  (A) a binder component,
  (B) a first rheology control agent, and
  (C) a second rheology control agent,
wherein
the first rheology control agent (B) is a non-aqueous dispersion resin (b),
the second rheology control agent (C) contains a reaction product of
  (c1) a polyisocyanate compound,
  (c2) a primary monoamine having a number average molecular weight of 300 or less, and
  (c3) a polyether amine having two or more amino groups and having a number average molecular weight of 1000 or more and less than 6000, and
the proportion of the polyether amine having two or more amino groups and having a number average molecular weight of 1000 or more and less than 6000 (c3) is within a range of 10 to 30 mass % based on the total amount of the components (c1) to (c3).

[2] The paint composition according to [1], wherein the polyether amine having two or more amino groups and having a number average molecular weight of 1000 or more and less than 6000 (c3) has three or more amino groups.

[3] The paint composition according to [1] or [2], wherein the proportion of the polyether amine having two or more amino groups and having a number average molecular weight of 1000 or more and less than 6000 (c3) is within a range of 15 to 30 mass % based on the total amount of the components (c1) to (c3).

[4] The paint composition according to any one of [1] to [3], wherein the proportion of the polyisocyanate compound (c1) is within a range of 30 mass % to 60 mass % based on the total amount of the components (c1) to (c3).

[5] The paint composition according to any one of [1] to [4], wherein the proportion of the primary monoamine having a number average molecular weight of 300 or less (c2) is within a range of 30 mass % to 60 mass % based on the total amount of the components (c1) to (c3).

[6] The paint composition according to any one of [1] to [5], wherein the non-aqueous dispersion resin (b) is an acrylic resin particle (b3) obtained by polymerizing a polymer dispersion stabilizer (b1) and at least one polymerizable unsaturated monomer (b2).

[7] The paint composition according to any one of [1] to [6], wherein the binder component (A) contains a hydroxy-containing resin (A1) and a crosslinking agent (A2).

[8] The paint composition according to [7], wherein the hydroxy-containing resin (A1) is a hydroxy-containing acrylic resin (A1-1).

[9] The paint composition according to [7] or [3], wherein the hydroxy-containing resin (A1) contains a secondary-hydroxy-containing acrylic resin (A1-1a).

[10] The paint composition according to any one of [7] to [9], wherein the hydroxy-containing resin (A1) contains a hydroxy- and alkoxysilyl-containing acrylic resin (A1-1b).

[11] The paint composition according to any one of [7] to [10], wherein the hydroxy-containing resin (A1) contains a secondary-hydroxy- and alkoxysilyl-containing acrylic resin (A1-1c).

[12] The paint composition according to any one of [7] to [11], wherein the crosslinking agent (A2) contains one, or two or more polyisocyanate compounds, and the content of the polyisocyanate compound is 5 to 60 parts by mass per 100 parts by mass of the solids content of the binder component.

[13] The paint composition according to any one of [7] to [11], wherein the crosslinking agent (A2) contains a blocked polyisocyanate compound, and the content of the blocked polyisocyanate compound is 5 to 60 parts by mass per 100 parts by mass of the solids content of the binder component.

[14] The paint composition according to any one of [7] to [11], wherein the crosslinking agent (A2) contains an amino resin, and the content of the amino resin is 0.5 to 40 parts by mass per 100 parts by mass of the solids content of the binder component.

[15] The paint composition according to any one of [1] to [14], wherein the content of the first rheology control agent (B) is within a range of 0.5 to 10 parts by mass per 100 parts by mass of the total solids content of the binder component (A) and the first rheology control agent (B), and the content of the second rheology control agent (C) is within a range of 0.05 to 1 part by mass per 100 parts by mass of the total solids content of the binder component (A) and the first rheology control agent (B).

The invention claimed is:

1. A paint composition comprising
(A) a binder component,
(B) a first rheology control agent, and
(C) a second rheology control agent,
wherein
the first rheology control agent (B) is a non-aqueous dispersion resin (b),
the second rheology control agent (C) contains a reaction product of
  (c1) a polyisocyanate compound,
  (c2) a primary monoamine having a number average molecular weight of 300 or less, and
  (c3) a polyether amine having two or more amino groups and having a number average molecular weight of 1000 or more and less than 6000, and the proportion of the polyether amine having two or more amino groups and having a number average molecular weight of 1000 or more and less than 6000 (c3) is more than 18 mass % and 28 mass % or less based on the total amount of the components (c1) to (c3), and
wherein the paint composition provides a sag resistance of 53 μm to 57 μm, the sag resistance being evaluated by measuring a film thickness on a test panel where 3 mm sagging of the paint composition was observed from the lower end of a punch hole.

2. The paint composition according to claim 1, wherein the polyether amine having two or more amino groups and having a number average molecular weight of 1000 or more and less than 6000 (c3) has three or more amino groups.

3. The paint composition according to claim 1, wherein the binder component (A) contains a hydroxy-containing resin (Al) and a crosslinking agent.

4. The paint composition according to claim 1, wherein the paint composition provides a finished appearance of 5.1 to 4.5, the finished appearance being evaluated based on a long wave (LW) value measured by using Wave Scan on a test panel.

* * * * *